US012052211B1

(12) United States Patent
Qin et al.

(10) Patent No.: US 12,052,211 B1
(45) Date of Patent: Jul. 30, 2024

(54) SYSTEMS AND METHODS FOR INTELLIGENT MESSAGE INTERACTION

(71) Applicant: International Business Machines Corporation, Armonk, NY (US)

(72) Inventors: Jun Qin, Beijing (CN); Li Hong Qi, Beijing (CN); Shuan Shuan Chen, Beijing (CN); Yu Fen Yuan, Beijing (CN); Chen Hui Xu, Xi'An (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/097,860

(22) Filed: Jan. 17, 2023

(51) Int. Cl.
*H04L 51/216* (2022.01)
*H04L 51/04* (2022.01)
*H04L 51/226* (2022.01)

(52) U.S. Cl.
CPC ............ *H04L 51/216* (2022.05); *H04L 51/04* (2013.01); *H04L 51/226* (2022.05)

(58) Field of Classification Search
CPC ...... H04L 51/216; H04L 51/226; H04L 51/04
USPC ......................................................... 709/206
See application file for complete search history.

(56) References Cited

U.S. PATENT DOCUMENTS

| | | | |
|---|---|---|---|
| 7,039,677 B2 | 5/2006 | Fitzpatrick | |
| 7,769,144 B2 | 8/2010 | Yao | |
| 8,700,545 B2 | 4/2014 | Aberdeen et al. | |
| 8,887,286 B2 | 11/2014 | Dupont et al. | |
| 9,116,984 B2 | 8/2015 | Caldwell | |
| 9,219,704 B2 | 12/2015 | Hamlin | |
| 9,886,664 B2 | 2/2018 | Dhara et al. | |
| 9,946,782 B2 | 4/2018 | Davis et al. | |

(Continued)

FOREIGN PATENT DOCUMENTS

CN          102831220 A       12/2012

OTHER PUBLICATIONS

Tan et al. "Context-Aware Conversation Thread Detection in Multi-Party Chat", Proceedings of the 2019 Conference on Empirical Methods in Natural Language Processing and the 9th International Joint Conference on Natural Language Processing, Nov. 3-7, 2019, pp. 6456-6461.

(Continued)

*Primary Examiner* — Lan Dai T Truong
(74) *Attorney, Agent, or Firm* — Robert D. Bean

(57) ABSTRACT

A computer implemented method for creating a prioritized global conversation thread in a data processing system comprising a processing device and a memory comprising instructions which are executed by the processing device, the method can comprise receiving a plurality of messages from a plurality of message channels; combining a plurality of subsets of the plurality of messages to form a plurality of conversation threads, wherein each subset of the plurality of messages forms one of a plurality of the plurality of conversation threads; extracting a plurality of important messages from the plurality of conversation threads, wherein at least one important message of the plurality of important messages is extracted from each of the plurality of conversation threads; storing the plurality of important messages; determining, for each of the plurality of important messages, a message priority; and displaying, to a user, the plurality of important messages based on the message priority.

18 Claims, 17 Drawing Sheets

(56) References Cited

U.S. PATENT DOCUMENTS

| | | | |
|---|---|---|---|
| 11,748,655 B2* | 9/2023 | Sridhar | H04L 51/42 707/E17.089 |
| 2015/0088784 A1* | 3/2015 | Dhara | G06N 5/02 706/11 |
| 2018/0197127 A1* | 7/2018 | Brunner | G06F 16/951 |
| 2019/0019160 A1* | 1/2019 | Champaneria | G06N 5/04 |
| 2021/0406366 A1* | 12/2021 | Betser | G06F 16/285 |

OTHER PUBLICATIONS

Domeniconi et al. "Identifying conversational message threads by integrating classification and data clustering", Communications in Computer and Information Science, 2017, pp. 25-46. < https://doi.org/10.1007/978-3-319-62911-7_2>.

Anonymous "Intelligent Rerouting to the Right Channels and Contextual Message Formation in Aggregated Fashion", IP.com, Jul. 22, 2021.

Anonymous "Method and Apparatus for Dynamic Notification Engine That Leverages Context Awareness and User Interactions", IP.com, Jun. 18, 2020.

Kriel, Colleen "With AI-powered highlights, Slack lets users focus on important messages", SiliconANGLE, Jun. 15, 2017. <https://siliconangle.com/2017/06/15/slack-lets-users-focus-important-messages-new-ai-powered-highlights-feature/>.

Gwizdka, "Reinventing the Inbox—Supporting the Management of Pending Tasks in Email," CHI EA '02: CHI '02 Extended Abstracts on Human Factors in Computing Systems [Article], Apr. 2002, 2 Pages, DOI: 10.1145/506443.506476, Retrieved from the Internet: <URL: https://dl.acm.org/doi/10.1145/506443.506476>.

Moody, "Reinventing Email," IBM Research, [accessed on Mar. 27, 2024], 3 pages,.

Whittaker, et al., "Revisiting and reinventing email," Human Computer Interaction [journal], Jan. 2005, 11 pages, vol. 20 (2005), No. 1 and 2, Retrieved from the Internet: <URL: https://www.researchgate.net/publication/33042767_Revisiting_and_reinventing_email>.

Anthdm, "How I used machine learning to classify emails and turn them into insights (part 1).," Medium.com [published in Towards Data Science], Apr. 25, 2017 [accessed on Feb. 27, 2024], 14 pages, Retrieved from the Internet: <URL: https://towardsdatascience.com/how-i-used-machine-learning-to-classify-emails-and-turn-them-into-insights-efed37c1e66>.

Anthdm, "How I used machine learning to classify emails and turn them into insights (part 2).," Medium.com [published in Towards Data Science], Dec. 17, 2017 [accessed on Feb. 27, 2024], 15 pages, Retrieved from the Internet: <URL: https://towardsdatascience.com/how-i-used-machine-learning-to-classify-emails-and-turn-them-into-insights-part-2-6a8f26477c86>.

Baidu Encyclopedia, "ReLU Function," Baidu [online], [accessed on Feb. 27, 2024], 3 pages, Retrieved from the Internet: <URL: https://baike.baidu.com/item/ReLU%20%E5%87%BD%E6%95%B0/22689567?fr=aladdin>. Translated by Google.

Dicksonjyl560101, "Finally someone explained text summarization in machine learning clearly!" ITPUB [blog], Apr. 19, 2019 [accessed on Mar. 7, 2024], 26 pages, Retrieved from the Internet: <URL: http://blog.itpub.net/29829936/viewspace-2641920/>, Translated.

Intelligent Transportation Technology, "What is pattern recognition?" 360.com [online], Jul. 30, 2021 [accessed on Feb. 27, 2024], 9 pages, Retrieved from the Internet: <URL: http://www.360doc.com/content/21/0730/15/39540953_988838213.shtml>. Translated by Google.

Izatt, "Making Gmail's tabbed inbox work better for you," Google Workspace [blog], Jan. 16, 2020 [accessed on Feb. 27, 2024], 3 pages, Retrieved from the Internet: <URL: https://workspace.google.com/blog/productivity-collaboration/how-gmail-sorts-your-email-based-on-your-preferences>.

Monkeylearn, "A practical explanation of a Naive Bayes classifier," MonkeyLearn.com [blog], [accessed on Feb. 29, 2024], 19 pages, Retrieved from the Internet: <URL: https://monkeylearn.com/blog/practical-explanation-naive-bayes-classifier/>.

Monkeylearn, "Text Classification: What it is And Why it Matters," MonkeyLearn.com [online], [accessed on Feb. 29, 2024], 35 pages, Retrieved from the Internet: <URL: https://monkeylearn.com/text-classification/>.

Visible Alpha, "Everything you need to know about email classification," Visible Alpha [blog], Apr. 2, 2018 [accessed on Feb. 27, 2024], 4 pages, Retrieved from the Internet: <URL: https://visiblealpha.com/blog/email-classification-overview/>.

Xiachong, et al., "Brief description of text summary," Jiqizhixin.com [article], Mar. 25, 2019 [accessed on Feb. 27, 2024], 17 pages, Retrieved from the Internet: <URL: https://www.jiqizhixin.com/articles/2019-03-25-7>.

* cited by examiner

Example data:

| R-item | $W_r$ | $W'_r$ | Thread 1 | Thread 2 | Thread 3 |
|---|---|---|---|---|---|
| Is my star channel? | 0.5 | 0.16 | x | | |
| Is contact in this channel too? | 0.8 | 0.26 | x | x | |
| How many my messages I post in this channel recently? (3 messages/1 day ago) | 0.4 | 0.13 | x | | x |
| Have 1 VS 1 message with contact ? ( 1 day ago) | 0.8 | 0.26 | x | x | |
| Have 1 VS 1 message with contact ? ( 2 day ago) | 0.6 | 0.2 | | x | x |
| $W''$ | | | 0.74 | 0.72 | 0.33 |

FIG. 8

SYSTEMS AND METHODS FOR INTELLIGENT MESSAGE INTERACTION

TECHNICAL FIELD

The present disclosure relates to systems and methods for using artificial intelligence (AI) to analyze message interactions between users and, more particularly, prioritizing instant messaging interactions based on AI analysis.

BACKGROUND

Teams of people can utilize collaborative software platform, such as Slack, Skype, Microsoft Teams, and the like, to communicate with one another. However, in using these platforms, they can accumulate a large number of messages. For example, one user may receive direct messages from his or her members of his work team, from message forums that can include other users outside of his work team, and notifications about messages on specific message threads based on projects he or she may currently be working within his work team, where he or she can receive direct messages with other members of the technical team. To determine respective priority and importance of each message and notification, a user must manually filter through the large number of notifications and messages, which can result in reduced productivity and efficiency.

Existing platforms lack the functionality to analyze the content of incoming messages to determine the messages' importance to a user. Furthermore, existing platforms lack the functionality to leverage AI analysis performed on the content of the incoming messages to prioritize each respective incoming message and present them to a user.

Therefore, there is a need for systems and methods that can analyze thread content patterns of individual conversation threads across different message channels to determine importance, prioritize individual conversation threads, and present a prioritized global conversation thread to a user to improve work efficiency and productivity. The present disclosure is directed to overcoming these and other problems of the prior art.

SUMMARY

Generally, an object of the disclosed subject matter to provide a computer implemented method for creating a prioritized global conversation thread in a data processing system comprising a processing device and a memory comprising instructions which are executed by the processing device, the method can include receiving a plurality of messages from a plurality of message channels, combining a plurality of subsets of the plurality of messages to form a plurality of conversation threads, wherein each subset of the plurality of messages forms one of a plurality of the plurality of conversation threads, extracting a plurality of important messages from the plurality of conversation threads, wherein at least one important message of the plurality of important messages is extracted from each of the plurality of conversation threads; storing the plurality of important messages, determining, for each of the plurality of important messages, a message priority, and displaying, to a user, the plurality of important messages based on the message priority.

In any of the embodiments disclosed herein, combining a plurality of subsets of the plurality of messages to form a plurality of conversation threads can include combining two or more messages of the plurality of messages based on one or more of each or the two or more messages' word relationship, channel characters, user role background, user relationship, and user history activities analysis.

In any of the embodiments disclosed herein, combining a plurality of subsets of the plurality of messages to form a plurality of conversation threads can include combining two or more messages of the plurality of messages based on a predefined policy. The predefined policy can be one of a time match policy and a topic match policy.

In any of the embodiments disclosed herein, extracting a plurality of important messages from the plurality of conversation threads can include determining that one of the messages of one of the plurality of conversation threads comprises a keyword, determining that one of the messages of one of the plurality of conversation threads comprises is from a person with an important role.

In any of the embodiments disclosed herein, determining a message priority includes determining a status of each of the plurality of conversation threads, wherein the status is one of open or closed, wherein important messages extracted from open conversation threads have a greater message priority than important messages extracted from closed conversation threads.

In any of the embodiments disclosed herein, determining a status of each of the plurality of conversation threads can include determining a pattern of one of the plurality of conversation threads, comparing the determined pattern to a completed pattern, determining that the determined pattern matches the completed pattern, and determining that the one of the plurality of conversation threads is closed.

In any of the embodiments disclosed herein, a pattern of one of the plurality of conversation threads can include a position of a popular sentence in the one of the plurality of conversation threads. In any of the embodiments disclosed herein, determining a status of each of the plurality of conversation threads can include determining a pattern of one of the plurality of conversation threads, comparing the determined pattern to a completed pattern; determining that the determined pattern does not match the completed pattern, and determining that the one of the plurality of conversation threads is open.

Another embodiment of the present disclosure generally relates to a computer program product configured to perform a process to create a prioritized global conversation thread, the process including receiving a plurality of messages from a plurality of message channels, combining a plurality of subsets of the plurality of messages to form a plurality of conversation threads, wherein each subset of the plurality of messages forms one of a plurality of the plurality of conversation threads, extracting a plurality of important messages from the plurality of conversation threads, wherein at least one important message of the plurality of important messages is extracted from each of the plurality of conversation threads, storing the plurality of important messages, determining, for each of the plurality of important messages, a message priority, and displaying, to a user, the plurality of important messages based on the message priority.

In any of the embodiments disclosed herein, the process performed by the computer program product can further include combining a plurality of subsets of the plurality of messages to form a plurality of conversation threads can comprise: combining two or more messages of the plurality of messages based on one or more of each or the two or more messages' word relationship, channel characters, user role background, user relationship, and user history activities analysis.

In any of the embodiments disclosed herein, the process performed by the computer program product can further include combining a plurality of subsets of the plurality of messages to form a plurality of conversation threads can include combining two or more messages of the plurality of messages based on a predefined policy. The predefined policy can be one of a time match policy and a topic match policy.

In any of the embodiments disclosed herein, the process performed by the computer program product can further include extracting a plurality of important messages from the plurality of conversation threads can include determining that one of the messages of one of the plurality of conversation threads comprises a keyword.

In any of the embodiments disclosed herein, the process performed by the computer program product can further include determining a message priority includes determining a status of each of the plurality of conversation threads, wherein the status is one of open or closed, wherein important messages extracted from open conversation threads have a greater message priority than important messages extracted from closed conversation threads.

In any of the embodiments disclosed herein, the process performed by the computer program product can further include determining a status of each of the plurality of conversation threads includes determining a pattern of one of the plurality of conversation threads; comparing the determined pattern to a completed pattern, determining that the determined pattern matches the completed pattern, and determining that the one of the plurality of conversation threads is closed.

In any of the embodiments disclosed herein, the process performed by the computer program product can further include determining a status of each of the plurality of conversation threads includes determining a pattern of one of the plurality of conversation threads, comparing the determined pattern to a completed pattern, determining that the determined pattern does not match the completed pattern, and determining that the one of the plurality of conversation threads is open.

Another embodiment of the present disclosure generally relates to a system for creating a prioritized global conversation thread included a processor and a memory comprising instructions that are executed by the processor to perform a method included receiving a plurality of messages from a plurality of message channels, combining a plurality of subsets of the plurality of messages to form a plurality of conversation threads, wherein each subset of the plurality of messages forms one of a plurality of the plurality of conversation threads, extracting a plurality of important messages from the plurality of conversation threads, wherein at least one important message of the plurality of important messages is extracted from each of the plurality of conversation threads, storing the plurality of important messages, determining, for each of the plurality of important messages, a message priority, and displaying, to a user, the plurality of important messages based on the message priority.

This summary is provided to introduce a selection of concepts in a simplified form that are further described below in the detailed description. This summary is not intended to identify key features or essential features of the claimed subject matter, nor is it intended to be used to limit the scope of the claimed subject matter. Additional features and advantages of the disclosed technology will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the disclosed technology, there are shown in the drawings embodiments that are presently preferred, it being understood, however, that the disclosed technology is not limited to the specific instrumentalities disclosed. Included in the drawings are the following Figures:

FIG. 8 is a table of example data, according to an embodiment of the disclosure;

DETAILED DESCRIPTION

Figure 1:
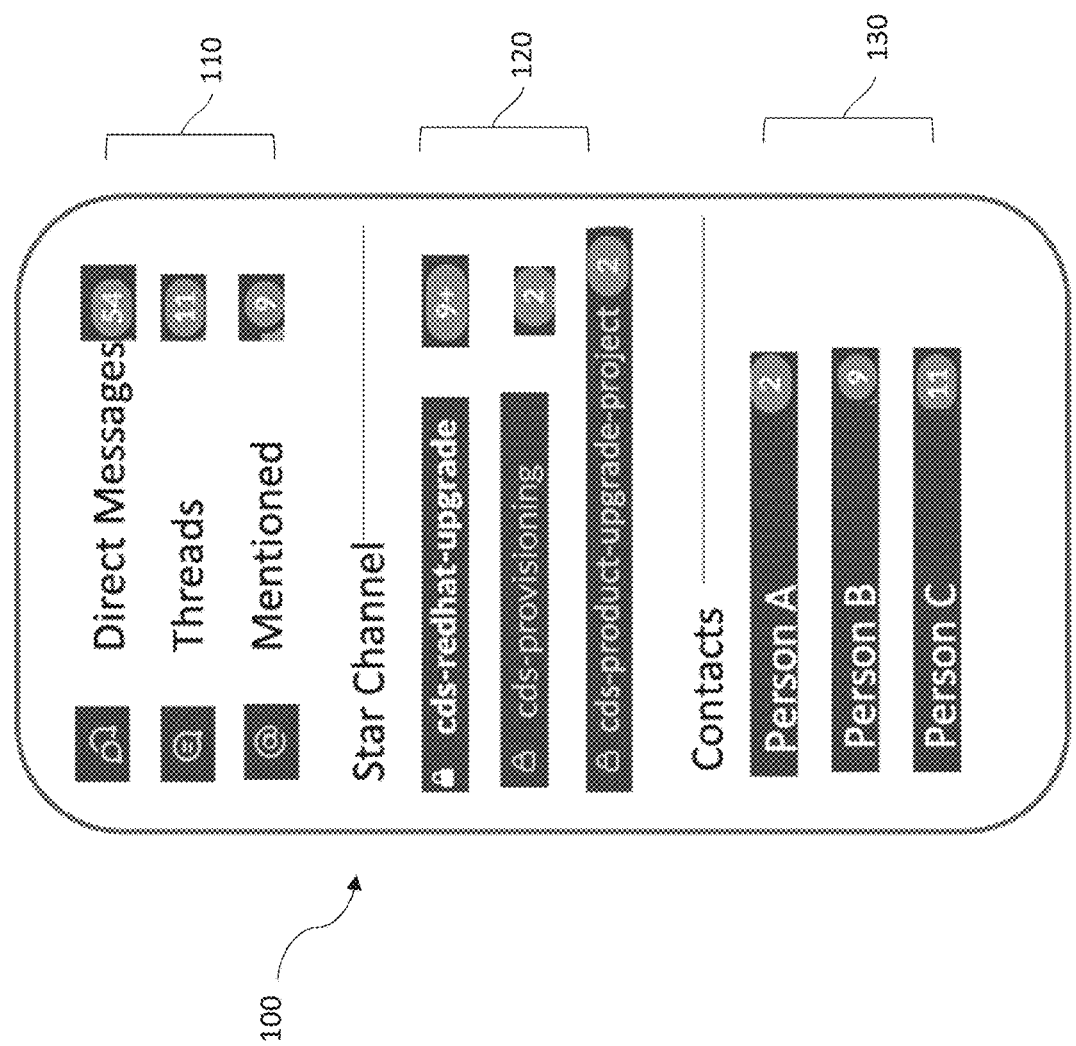
FIG. 1 illustrates an example team collaboration software platform interface, according to an embodiment of the disclosure.

The present disclosure describes systems and methods that can use artificial intelligence (AI) to analyze message interactions between one or more users and prioritize these message interactions based on the AI analysis. Embodiments of the present disclosure may include a system, a method, and/or a computer program product.

Some communications are "live," meaning that the parties to the communications are communicating with each other at the same time. Other communications are not live; a sender transmits a communication to a receiver who will address the communication at a later time. There are several examples of communications that are not live: letters, voicemails, email, instant messages. While these types of communications can be very helpful, if they are not actively monitored, these communications can accumulate. This can happen, for example, when employees who work in different time zones communicate with each other. For example, an employee based in China may send emails during her working hours that are received by an employee based in the United States during non-working hours. If many of these communications accumulate, it can be difficult to quickly find the highest priority communications that a user should address first. The subject matter disclosed herein seeks to solve this and other problems in the prior art by providing systems and methods to create a prioritized global conversation thread.

In an embodiment, a system can receive messages from several different sources. For example, the system can receive messages from one or more instant messages programs and one or more email programs. Then, the system can combine these messages into message threads based on message relationships. Once the messages are categorized into message threads, the system can extract at least one important message from each message thread. The system can prioritize each important message, rank each important message according to its priority, and present the ranked list of important messages to a user. Thus, instead of having to manually read and prioritize each message, the user has a list of the highest priority messages.

As mentioned above, the system can combine these messages into message threads. In some embodiments, this can be done based on message relationship. A message relationship can be based on word relationship, channel characters, user role background, user relationship, and user history activity analysis. Regarding word relationship, messages may be related if they contain the same or similar terms. Regarding user role background, messages may be related is the sender or recipient of the message have the same role or position in a business. Regarding user relationship, messages may be related if the sender or recipient of the messages have a relationship. For example, messages may be related if the sender is the recipient's supervisor. Regarding user history activity analysis, messages may be related if the sender and the recipient have often communicated in the past. In some embodiments, two or more messages can be combined to form a message thread based on a predefined policy, like a time match policy or a topic match policy.

Once the messages are categorized into message threads, the system can extract at least one important message from each thread. In some embodiments, a message is important if it contains a keyword. For example, a message may be important if it contains the term "urgent." Alternatively or additionally, in some embodiments, a message is important if the message's sender or recipient has an important role. For example, a message may be important if it is sent to or received from the president or general counsel of a business.

The important messages can be prioritized in a variety of ways. In some embodiments, an important message's priority may be based on the sender's role within a business. For example, in some embodiments, a message from the business's president may have a higher priority than a message from the business's mid-level manager. Alternatively or additionally, an important message's priority may be based on whether the important message contains one or more keywords. For example, in some embodiments, a message that contains the keyword "critical" may have a higher priority than messages that do not. Alternatively or additionally, an important message's priority may be based on the amount of feedback contained in the message. For example, in some embodiments, a message that contains a lot of feedback may have a higher priority than a message that contains less feedback.

Alternatively or additionally, in some embodiments, the priority of an important message can be based on whether the message thread is open or closed. An important message from an open message thread can be a higher priority than an important message from a closed thread. A message thread is "open" when the conversation appears to be on-going. In other words, the topic of the messages is not complete. A message thread is "closed" when the conversation appears to be complete. For example, if the topic of the conversation is the filing of an application by December 31, the message may be considered closed after December 31. The system can determine whether a message thread is open or closed based on the message thread's pattern. The pattern of a message thread can be a message's content format. In some embodiments, a pattern can be the relative position of a popular sentence within the message thread. To determine whether a message thread is open or closed, the system can compare a pattern of the message thread containing the important message to a pattern of a thread that is known to be open or closed. If the message thread's pattern matches a closed pattern, the message thread may be closed. If the message thread's pattern matches an open pattern, the message thread may be open.

The systems and methods disclosed herein can use one or more machine learning algorithms. For example, in an embodiment, the system can use a first machine learning algorithm to combine messages into message threads, use a second machine learning algorithm to determine whether a message thread is opened or closed, and use a third machine learning algorithm to determine a priority of an important message. Each machine learning algorithm can be trained on a different set of training data and may be iteratively retrained to improve itself.

Although certain examples of the disclosed technology are explained in detail, it is to be understood that other examples, embodiments, and implementations of the disclosed technology are contemplated. Accordingly, it is not intended that the disclosed technology is limited in its scope to the details of construction and arrangement of components set forth in the following description or illustrated in the drawings. The disclosed technology can be implemented in a variety of examples and can be practiced or carried out in various ways. In particular, the presently disclosed subject matter is described in the context of being used in Slack. The present disclosure, however, is not so limited, and can be applicable to other collaborative software platforms. The present disclosure, for example and not limitation, can be used within and across other collaborative software platforms. Examples of collaborative software platforms can include but not be limited to Skype, Microsoft Teams, Slack, GitHub, and the like. Such implementations and applications are contemplated within the scope of the present disclosure. Accordingly, when the present disclosure is described in the context of being used in Slack, it will be understood that other implementations can take the place of those referred to.

FIG. 1 illustrates an example team collaboration platform interface that a user can interact with to manage incoming message notifications received from one or more users. As should be appreciated, team collaboration software platforms may be used for cross-time zone collaboration amongst members of technical and non-technical teams to coordinate efforts on tasks, track progress on ongoing issues, and/or enable instant communication between team members in both individual and group messaging settings.

For illustrative purposes with respect to the present disclosure, FIG. 1 shows a navigation pane 100 of the team collaboration software platform called Slack. It should be appreciated that although the team collaboration software platform Slack is used to illustrate aspects of the present disclosure, the present disclosure is not so limited. Within the navigation pane 100, there may be a first portion 110, a second portion 120, and a third portion 130.

The first portion 110 may contain a user's direct messages, threads, and mentions. The numbers shown next to each entry in the first portion 110 refer to the number of unread notifications received by a user. Threads can be specialized group conversations about a specific topic or issue of interest to a user. Direct messages may be group or individual instant message conversations between one or more users. Mentions may be instances where a user can receive directed notification for matters that may require their immediate attention. The second portion 120 of the navigation pane 100 can show a user starred channels. Starred channels are conversation threads that a user may mark to keep track of conversations of interest. As with the first portion, the numbers next to each entry in the second portion 120 refer to the number of unread notifications received by a user. The third portion 130 of the navigation pane 100 may include recent conversation threads with users and/or conversation threads with contacts. Similar to the first portion 110 and the second portion 120, the numbers next to each of the entries refer to the number of unread notifications by a user As one skilled in the particular art will appreciate, the navigation pane 100 can be customized to user preference.

Figure 2:
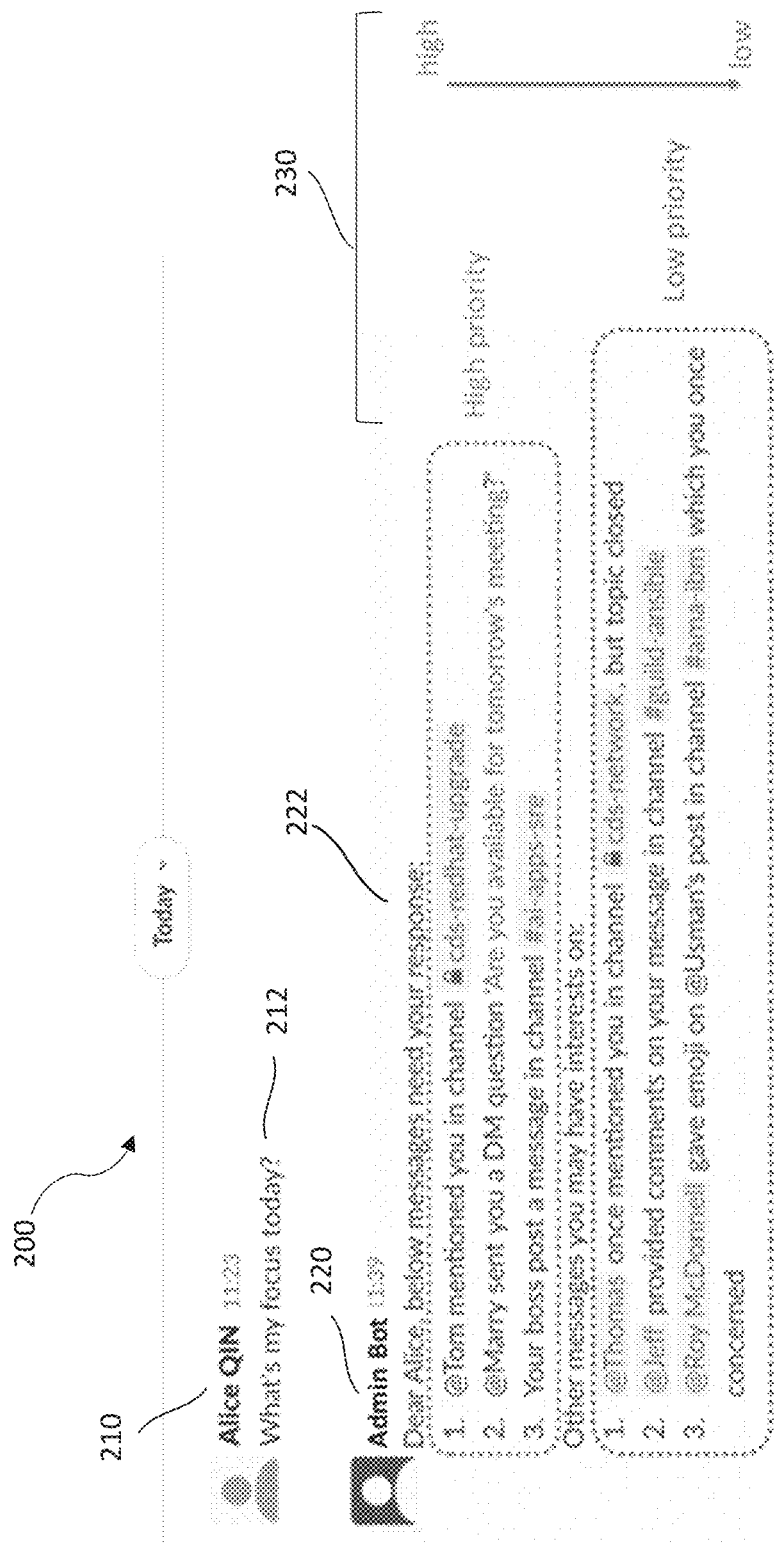
FIG. 2 illustrates an example message interface displaying a prioritized global conversation thread to a user, according to an embodiment of the disclosure.

FIG. 2 illustrates an example message interface displaying a prioritized global conversation thread to a user, according to an embodiment of the disclosure. For illustrative purposes with respect to the present disclosure, the example message interface 200 shown in FIG. 2 is from the team collaboration software program Slack. It should be appreciated that although the team collaboration software platform Slack is used to illustrate aspects of the present disclosure, the present disclosure is not so limited.

As illustrated in FIG. 2, a first user 210 can interact with an Admin Bot 220 via the message interface 200, which can provide features such as sending reminders to a user, sending customized responses on message threads, providing technical support information on Slack and the like. As shown in FIG. 2 and with respect to aspects of the present disclosure, a first user input 212 can trigger a customized response 222 from the Admin Bot 220, which can resemble the previously mentioned Slack Bot. The customized response 222 from the Admin Bot 220 may include a prioritized global conversation thread 230. As shown in FIG. 2, the prioritized global conversation thread 230 may be organized and shown to the first user, wherein high priority messages 232 can be pushed to the top of the customized response 222 and lower priority messages can be pushed to the bottom of the customized response 222.

Figure 3:
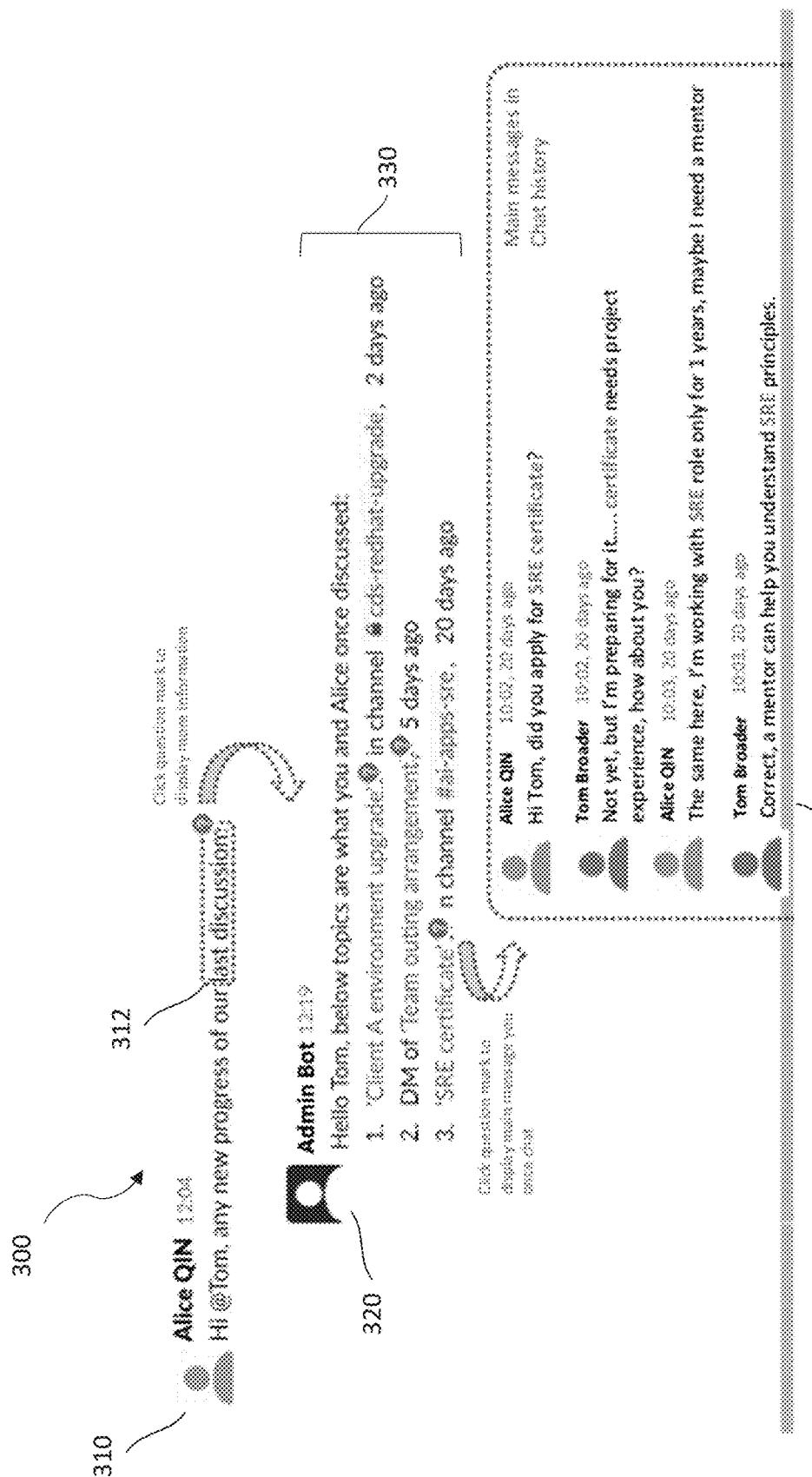
FIG. 3 illustrates an example feature of an example prioritized global conversation thread, according to an embodiment of the disclosure.

FIG. 3 illustrates an example feature of an example prioritized global conversation thread, according to an embodiment of the disclosure. The message interface 300 may include a first user 310 interacting with an Admin Bot 320. The first user 310 may provide a user input 312, which can result in a customized response 322 that may be sent to the first user 310. The customized response 322 can include a global prioritized conversation thread 330 that can be displayed to the first user. The global prioritized conversation thread 330 can also include a feature allowing the first user 310 to reference the original individual conversation thread 332 within the global prioritized conversation thread. For example, the first user 310 may hover a pointing device over the individual conversation thread 332 within the global prioritized conversation thread 330 which can allow the first user to view the individual conversation thread 332.

Figure 4:
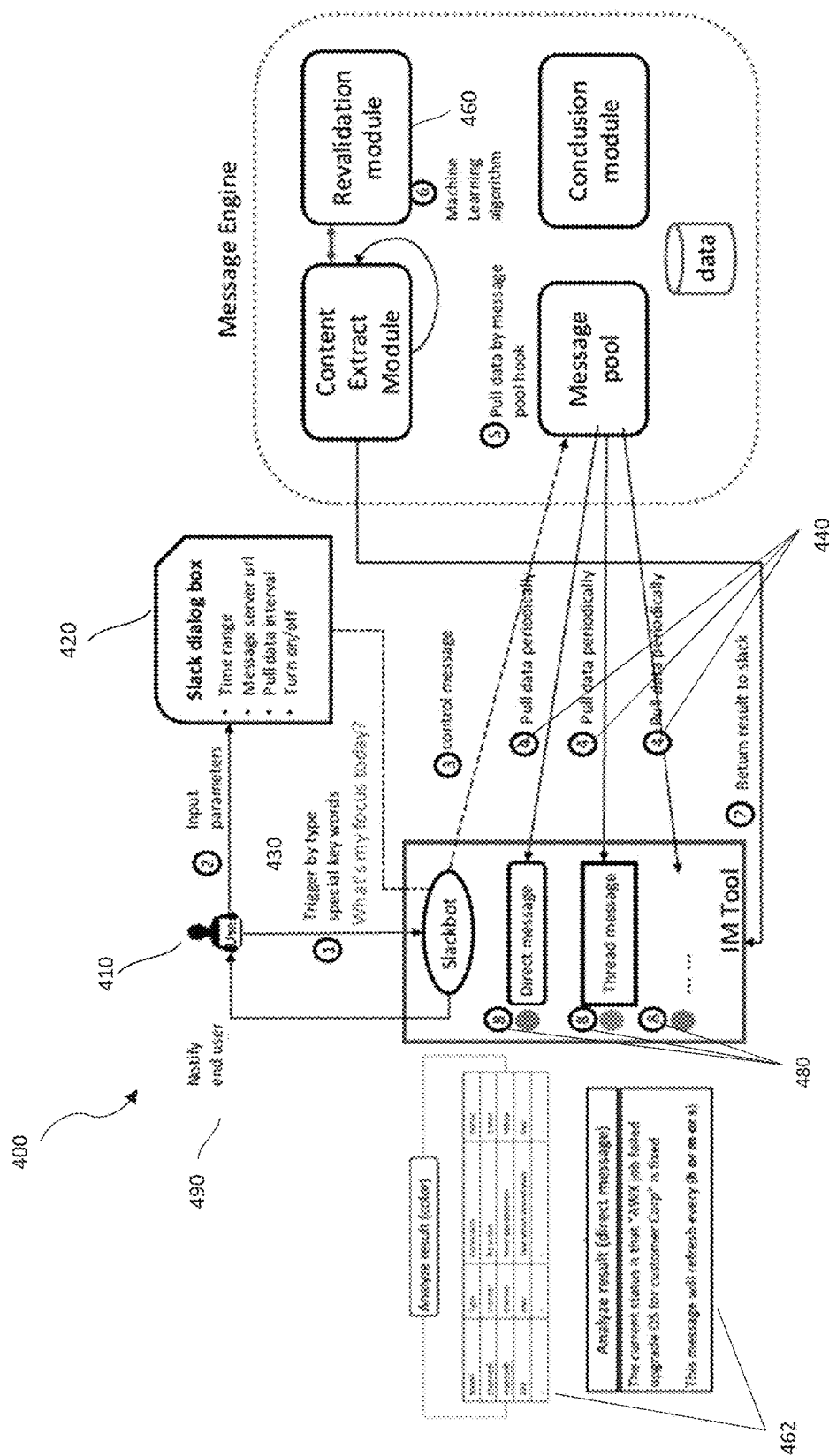
FIG. 4 illustrates how a prioritized global conversation thread can be created, according to an embodiment of the disclosure.

FIG. 4 illustrates how an example prioritized global conversation thread can be created, according to an embodiment of the disclosure. For illustrative purposes, the example team collaboration software platform shown in FIG. 4 is Slack, however the present disclosure is not so limited. The first numbered item 410 describes a user interacting with the Admin Bot, which may include sending a specified user input string. For example, the user may submit a specified user input string such as, "What's my focus today?", to receive a response from the Admin Bot. The second numbered item 420 describes one or more parameters that can be adjusted to return a response based on said one or more parameter. For example, as shown by the second numbered item 420, the one or more parameters can include time range, a user designated message server url, a user specified interval for pulling message data from the message server url, and/or an enable/disable option for the Admin Bot feature. The third numbered item 430 describes a control message that can be sent by the Admin Bot 320 to access the messages within the message pool.

As shown in FIG. 4, the fourth numbered items 440 are arrows that show the sources of data that may be pulled into the message pool. The sources of data, shown as 480, can include direct messages, thread messages and the like. Once the sources of data are within the message pool, a content extract module may extract one or more features from the individual conversation messages in the message pool. As shown by 460, the content extract module communicates with a revalidation module, which may utilize a machine learning algorithm to analyze the one or more features as shown in the analysis result 462. The analysis result 462 can be used to create a prioritized global conversation thread and can be displayed to the user 490, which can resemble the message interfaces shown in FIGS. 2-3.

Figure 5:
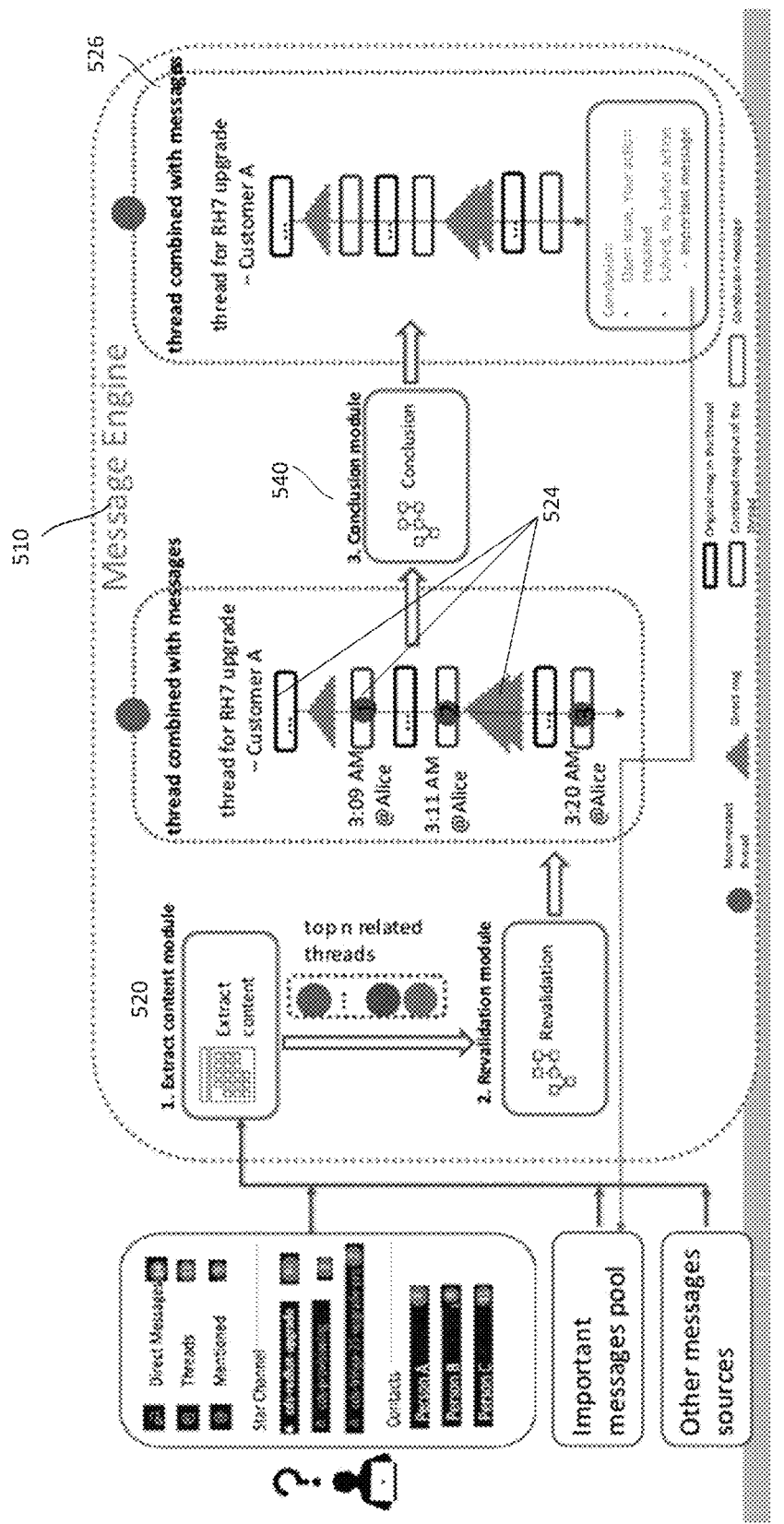
FIG. 5 illustrates how features of individual conversation messages can be extracted and ranked to create an example prioritized global conversation thread, according to an embodiment of the disclosure.

FIG. 5 illustrates how features of individual conversation messages can be extracted and ranked to create an example prioritized global conversation thread, according to an embodiment of the disclosure. For illustrative purposes, the example team collaboration software platform shown in FIG. 5 is Slack, however the present disclosure is not so limited. Within the message engine 510, data that can be associated with individual conversations may be pulled from one or more sources 512. The one or more sources 512 of the data can include direct mentions, threads, mentions, starred channels, Slack contacts, other message sources, and/or important messages pool. Data for the important messages pool may be received from the result of a conclusion module 540, shown as numbered item 3 in FIG. 5. Once the one or more sources 512 are pulled, the data from the one or more sources 512 may be received by an extract content module 520. The extract content module 520 may extract one or more individual message threads 524 related to features that can be defined by the user, as shown in FIG. 4, and can be combined into a thread based after being received by a revalidation module 530.

In some embodiments, one or more individual message threads 524 can be combined based on a topic shared amongst the one or more individual message threads 524. As shown in FIG. 5, the thread with combined messages 526 can include direct messages 528 interspersed between original messages 532. This can be advantageous as the one or more individual message threads 524 coming from one or more sources 512 can be used to determine a conclusion of a topic 544, which can be based on the content within the thread with combined messages 526. The status of the thread with combined messages 526 can be determined once the thread with combined messages 526 is received through a conclusion module 540. The conclusion module 540, as shown in FIG. 5, can determine whether the thread with combined messages 526 is open or closed and may provide the thread with combined messages 526 to the important messages pool as previously mentioned.

Figure 6:
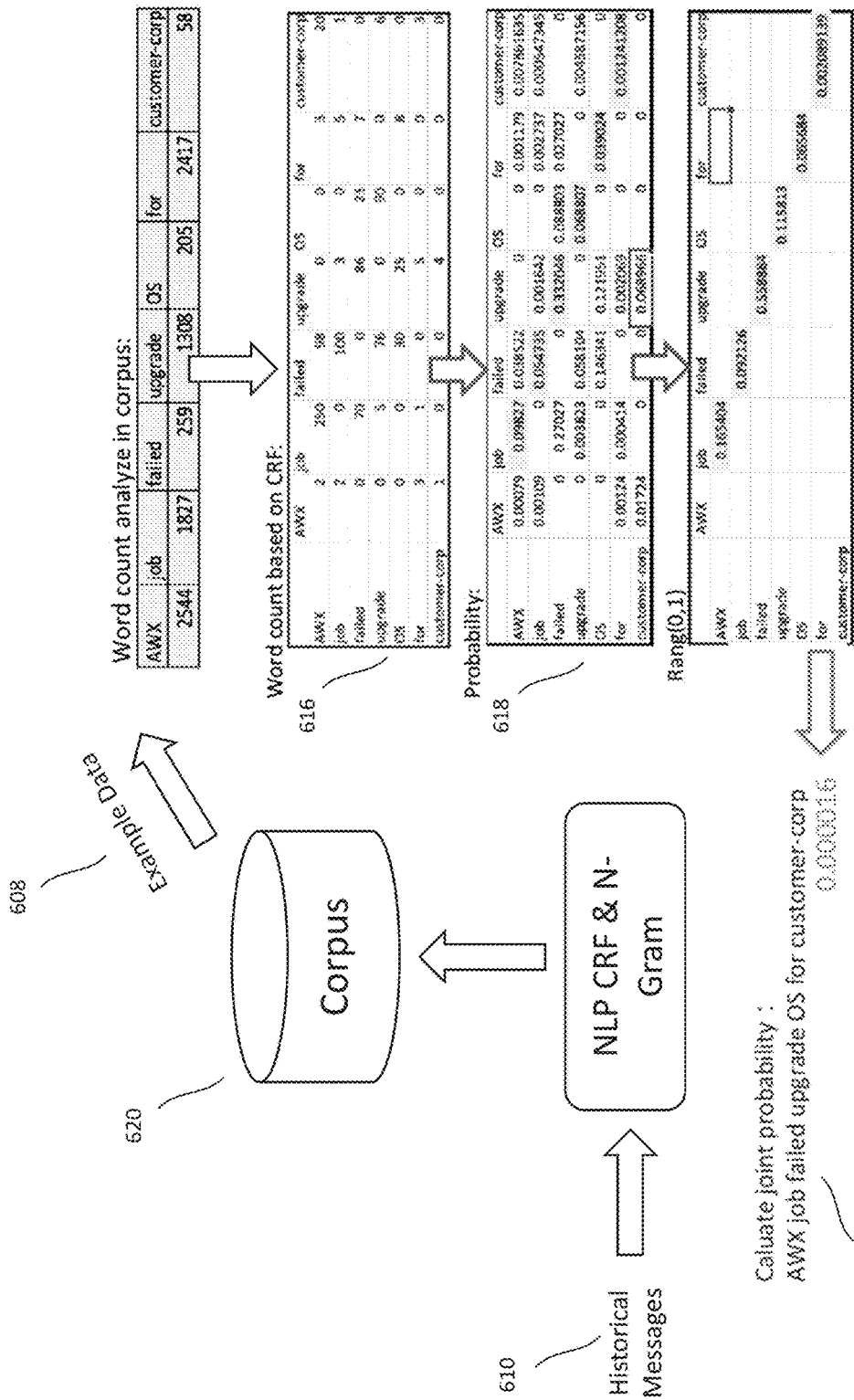
FIG. 6 illustrates how a corpus can be built, according to an embodiment of the disclosure.

FIG. 6 illustrates how a corpus can be built, according to an embodiment of the disclosure. As one skilled in the particular art will appreciate, corpuses can contain text or speech data that can be used to train AI and machine learning systems. As will also be appreciated, natural language processing (NLP) is a type of machine learning algorithm that can be trained on text or speech data via a corpus to understand and interpret said text and/or speech data. With respect to the present disclosure and as shown in FIG. 6, the computer implemented method, system, or computer program product may use conditional random fields (CRFs) with NLP to extract features from historical messages 610 in order to build the corpus 620.

The features can include sequence of words in an individual conversation thread and the context of words used in an individual conversation thread. The sequence of words can be represented in NLP as an n-gram model, wherein n can represent the sequence and number of words within an individual conversation thread. For example, for a message within an individual conversation thread that contained the word "New York", the value of n would be 2 and can be identified as a 2-gram model. Through application of CRFs, NLP, and n-gram modeling, the computer implemented method, system, and/or computer program product can build a corpus 620 and perform analysis on words within historical messages 610. This analysis can determine word context based on a sequence of a word and a word's context in historical messages 610. Additionally, the analysis can be used to calculate one or more probabilities of word context in newly received and/or updated individual conversation threads. The following equations may be used by the computer implemented method, system, and/or computer program product to analyze word context of historical messages 610 in order to calculate one or more probabilities of words and their context within newly received individual conversation threads and/or historical messages 610:

$$P(W_i | W_{i-n-1}, \ldots, W_{i-1}) = \frac{C(W_{i-n-1}, \ldots, W_i)}{C(W_{i-n-1}, \ldots, W_{i-1})}$$

$$\prod_{w \in C} p(w | \text{Context}(w))$$

The above mentioned equations can be used to calculate the probability of an upcoming word based on the context and position of a word with respect to other words in the individual conversation thread. The variable C may represent the corpus 620, the function C(w) can represent the context of a word within the individual conversation thread, and $C(w_i = w_{i+n+1} \ldots + w_{i-1})$ can represent the context each word in sequence within the individual conversation thread.

As shown in FIG. 6, example data 608 can be analyzed in the corpus 620 using the NLP and CRF. The word count of the example data based on CRF 616 may then be used to calculate probabilities 618 for each word with respect to their sequence in the individual conversation thread to determine a joint probability 620. The joint probability can be used by the computer implemented method for newly received individual conversation threads to determine word context and words, which can be used in the creation of a global prioritized conversation thread.

Figure 7:
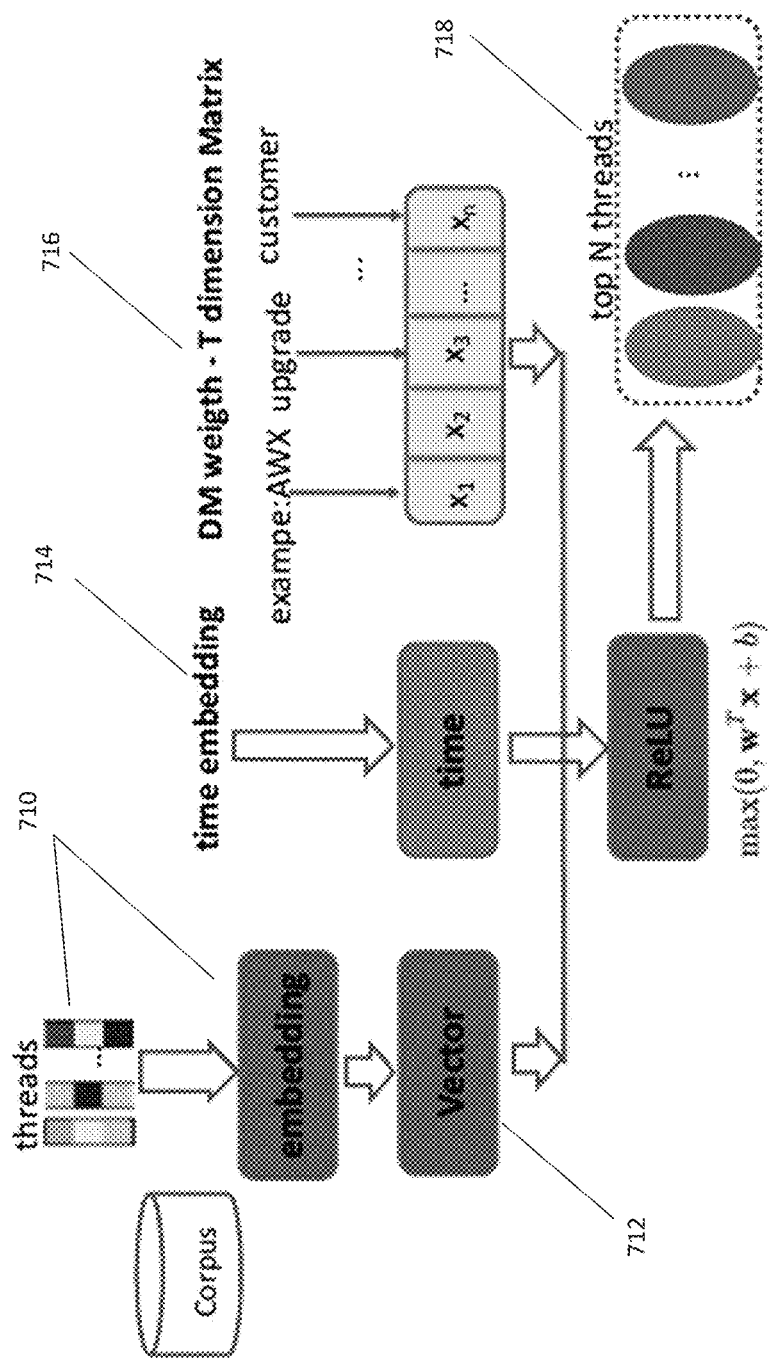
FIG. 7 illustrates how one or more individual conversation threads can be extracted, a message relationship is determined for each of the extracted one or more individual message threads, and a ranking order is determined for each of the extracted one or more individual conversation threads, according to embodiments of the disclosure.

FIG. 7 illustrates how one or more individual message threads can be extracted and a message relationship can be determined for each of the one or more individual message threads. Individual conversation threads may be embedded 710 within vectors 712, according to an embodiment of the disclosure. The individual conversation threads may then be combined into a combined thread. As will be appreciated, each of the individual conversation threads embedded in the vectors can have time information embedded within them. Additionally each of the individual conversation threads within the combined thread can be weighed based on certain relationship features. As shown in FIG. 7, the embedded time information 714 and calculated weights of the relationship features 716 for each of the individual conversation threads may be used to reorder the top N threads 718 within the combined thread.

FIG. 8 is a table of example data, according to an embodiment of the disclosure. As shown in FIG. 8, data can be used to perform relationship calculations performed within the revalidation module on individual message threads to determine priority within the combined thread. The table 800 can take into account relationship features for each of the individual message threads within the combined thread. As shown in FIG. 8, these relationship features 810 can also be known as R items that can be assigned specific weighted values $W_r$ 812. Based on the specific weighted values $W_r$ 812 for each of the R-items, a formalized weight matrix value $(W'_r)$ 814 can be calculated using the following formula below:

$$W'_r = \frac{W_r}{\sum_{i=1}^{n} W_r}$$

It should be appreciated that a weight matrix $(W'_r)$ 814 can be calculated for each individual conversation thread. Once a formalized weight matrix value $W'_r$ 814 is calculated for each of the individual conversation threads, a weighted relationship value W"816 between the individual conversation threads is calculated using the following equation:

$$W_i'' = \begin{bmatrix} W_{i1}' \\ \vdots \\ W_{in}' \end{bmatrix} [1 \ \ldots \ 0]$$

Once the weighted relationship value W"$_r$ 816 for each of the individual message threads within the combined thread is calculated, the individual conversation threads can be reordered within the combined thread using the following equation:

$$P_i = k * P_i + (1-k) * P_i * \frac{W_i''}{\sum_{i=1}^{n} W_i''}$$

The above equation can describe a joint probability equation $P_i$, which may be used on newly extracted individual conversation threads that may be included into the combined thread. It should be appreciated that in addition to the above mentioned equations, time order can also be considered in the reordering of individual conversation threads.

Figure 9:
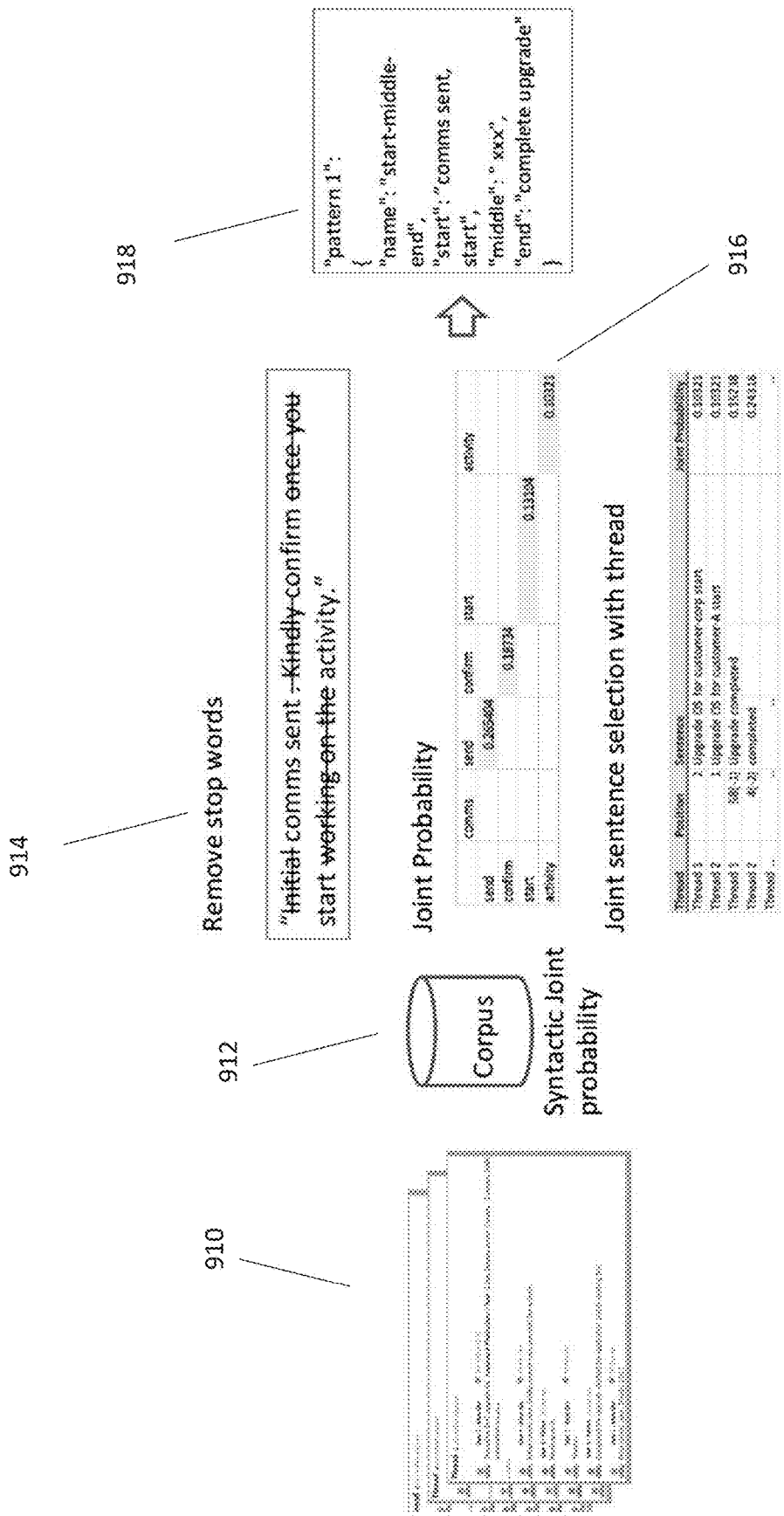
FIG. 9 illustrates how thread content patterns from individual conversation threads can be extracted to determine message thread status in the conclusion module, according to embodiments of the disclosure.

FIG. 9 illustrates how thread content patterns from individual conversation threads can be extracted, according to embodiments of the disclosure. One or more individual threads 910 of the combined thread can be validated against a corpus 912 to determine syntactic joint probability. The corpus 912 can include one or more thread content patterns that can be used to determine message status of the individual conversation threads. For example, a thread content pattern determined from individual conversation threads, when compared against the pattern list in the corpus 912, can indicate whether an individual conversation thread is open or closed. As should be appreciated, individual conversation threads with an open message status can be ranked higher than an individual conversation thread with a closed message status within a combined thread.

As shown in FIG. 9, NLP and CRF may be used to remove stop words 914 within individual conversation threads to calculate the syntactic joint probability 916. As mentioned previously, syntactic joint probability can be used to determine upcoming words and their context within individual conversation threads. For example, as shown in FIG. 9 the syntactic joint probability 916 can be used to determine a thread content pattern 918 for the individual conversation thread. Once the thread content pattern 918 for the individual conversation thread is determined, the conclusion module can determine the message status of the individual conversation thread.

Figure 10:
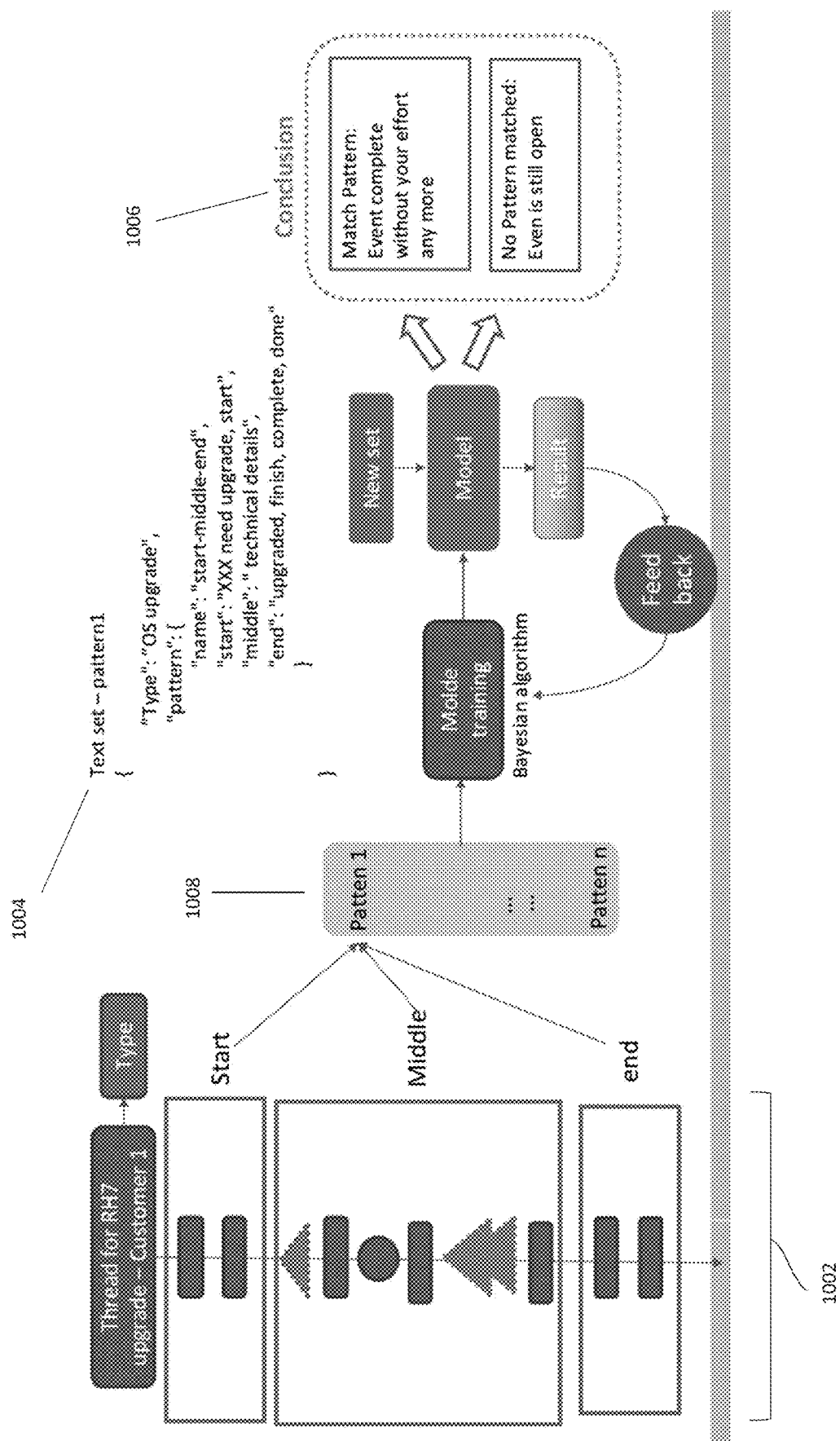
FIG. 10 illustrates a diagram showing how a thread content pattern can be determined for an individual conversation thread in order to determine a message status for the individual conversation thread, according to embodiments of the disclosure.

FIG. 10 illustrates a diagram showing how a thread content pattern can be determined for an individual conversation thread in order to determine a message status for the individual conversation status, according to embodiments of the disclosure. As shown in FIG. 10, portions of an individual conversation thread 1002 may be analyzed to create a thread content pattern 1004. The thread content pattern 1004 from the individual conversation thread 1002 may be used to train the machine learning algorithm. For example, the machine learning algorithm may be trained using the Bayesian algorithm, which can compare the thread content pattern 1004 obtained from the individual conversation thread 1002 with a corpus which may contain a thread content pattern list 1008. The result of the comparison of the thread content pattern 1006, which may be a message status of the individual conversation thread 1002, may be used to provide feedback to the machine learning algorithm which in turn may be used to further train said machine learning algorithm.

Figure 16:
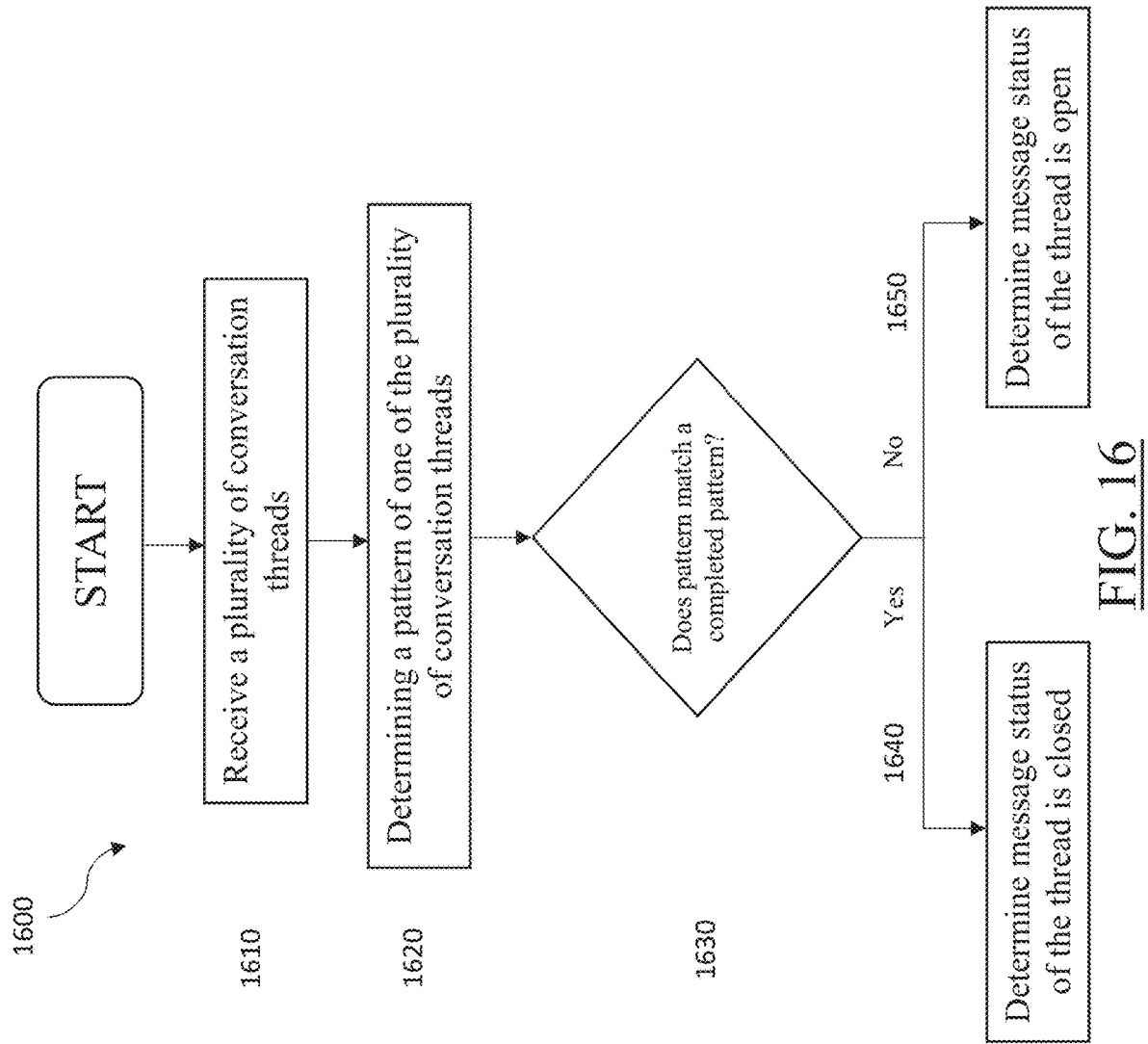
FIG. 16 is a flow chart showing how message status can be determined for an individual message within a conversation thread, according to an embodiment of the disclosure.

For example, if the thread content pattern 1004 matches a thread content pattern within the corpus' pattern list, the individual conversation thread message status can be determined as closed, as shown in FIG. 16. Conversely, if the thread content pattern 1004 does not match a thread content pattern within the corpus' pattern list, the individual conversation thread message status can be determined as open, as also shown in FIG. 16. It should also be appreciated that a thread content pattern, such as the thread content pattern 1004 shown in FIG. 10, can be marked as a completed pattern and added to thread content pattern list 1008 to further train the machine learning model.

Figure 11:
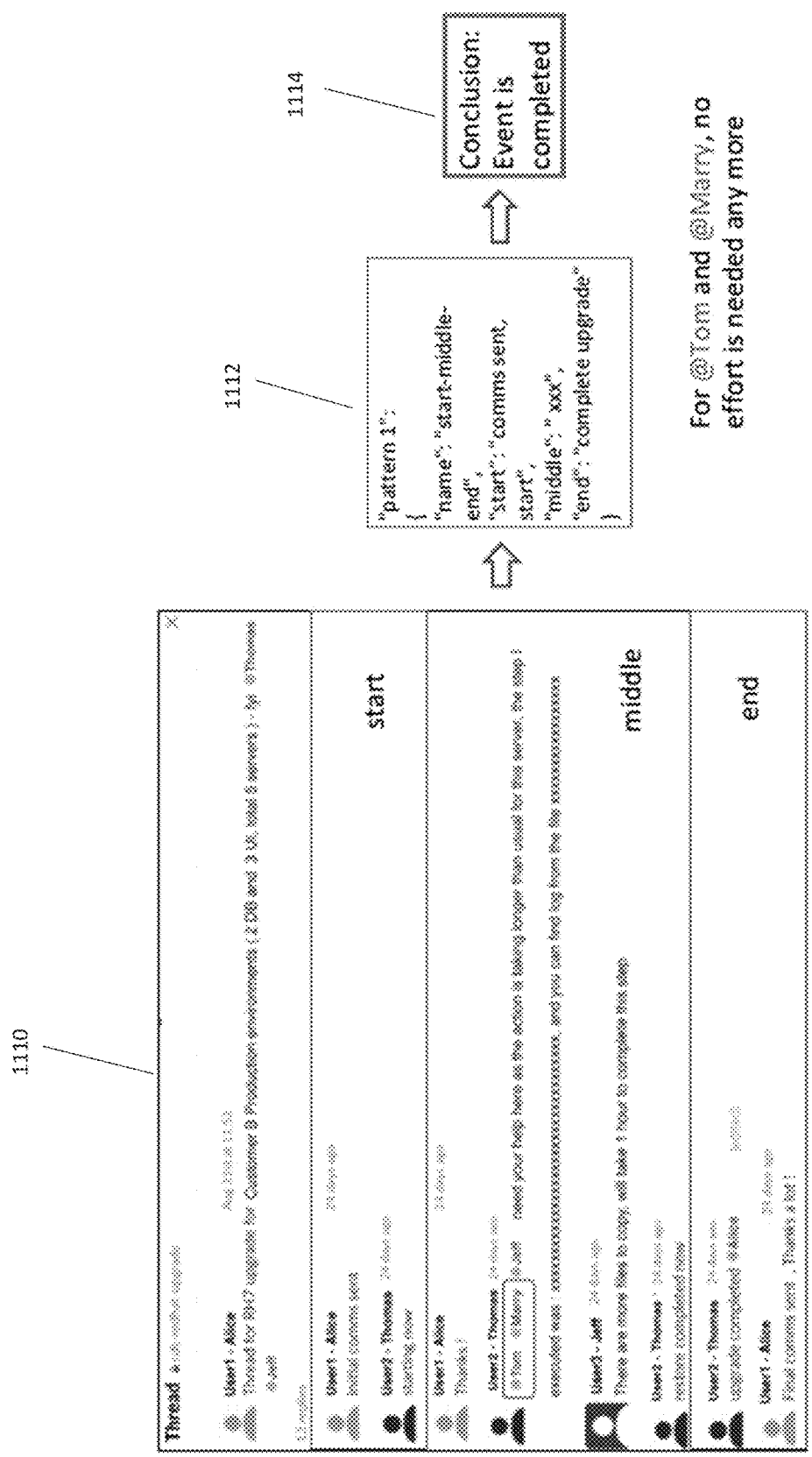
FIG. 11 illustrates an example scenario wherein message status for an individual conversation thread can be determined based on a thread content pattern, according to embodiments of the disclosure.

FIG. 11 illustrates an example scenario wherein message status for an individual conversation thread can be determined based on a thread content pattern extracted from the individual message thread, according to embodiments of the disclosure. As mentioned previously, the conclusion module can determine message status of an individual conversation thread. As shown in FIG. 11, the individual conversation thread 1110 can be analyzed to determine a thread content pattern 1112. The thread content pattern 1112 can be compared against the thread content pattern list within the corpus to determine message status. In the scenario presented in FIG. 11, the thread content pattern 1112 matched a completed pattern within the corpus, which can be indicated by the conclusion module returning a message status 1114 of closed.

Figure 12:
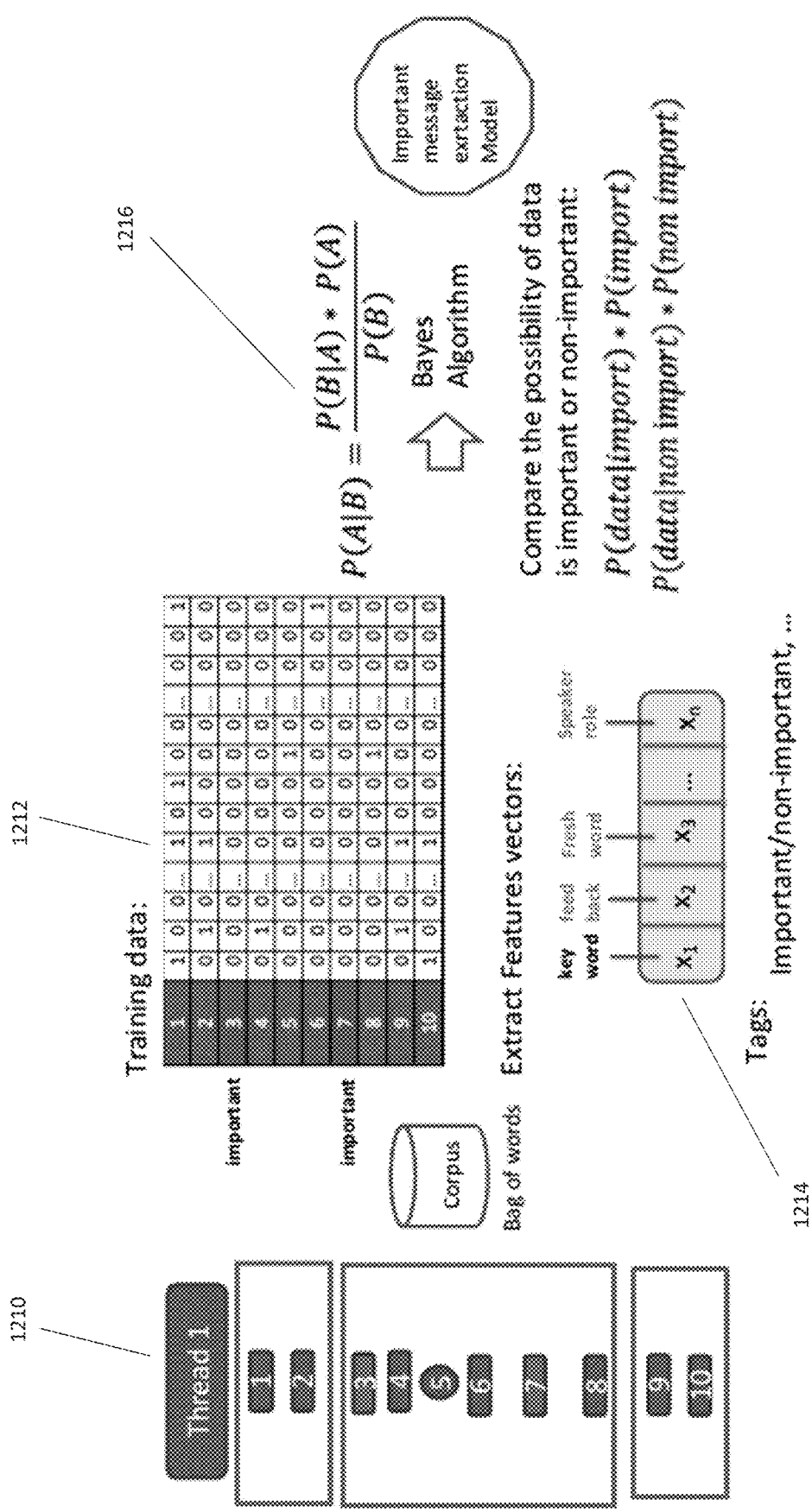
FIG. 12 illustrates how features extracted from individual conversation threads can be used to determine the message thread's importance, according to an embodiments of the disclosure.

FIG. 12 illustrates how features extracted from individual conversation threads can be used to determine whether the individual message thread contains important or non-important data, according to an embodiment of the disclosure. As shown in FIG. 12, the individual conversation thread 1210 can contain a plurality of individual messages. Each of the individual messages within the individual conversation thread 1210 can be analyzed through use of NLP. For example, NLP can use a bag of words corpus which can prioritize the frequency of words within the individual messages contained within the individual conversation thread 1210. The analysis of the individual conversation thread 1210 using NLP may include comparing the bag of words corpus' training data 1212 against feature vectors 1214 extracted from the individual conversation thread 1210. The result of the analysis from NLP can determine if individual messages within the individual conversation thread 1210 are important or non-important. As one skilled in the pertinent art can appreciate, NLP may perform this message importance determination through use of Bayes Algorithm, which can compare the possibility that the individual messages contain data making said messages important or non-important. The Bayes algorithm equation 1216 that may be used by NLP to determine if a message is important or non-important is shown below:

$P(\text{data}|\text{import}) * P(\text{import})$ $P(\text{data}|\text{non import}) * P(\text{non import})$ It should also be appreciated that the extracted feature vectors 1214 from the individual conversation thread 1210 may include keywords and/or if the sender of the individual message is a user with a specified role.

Figure 13:
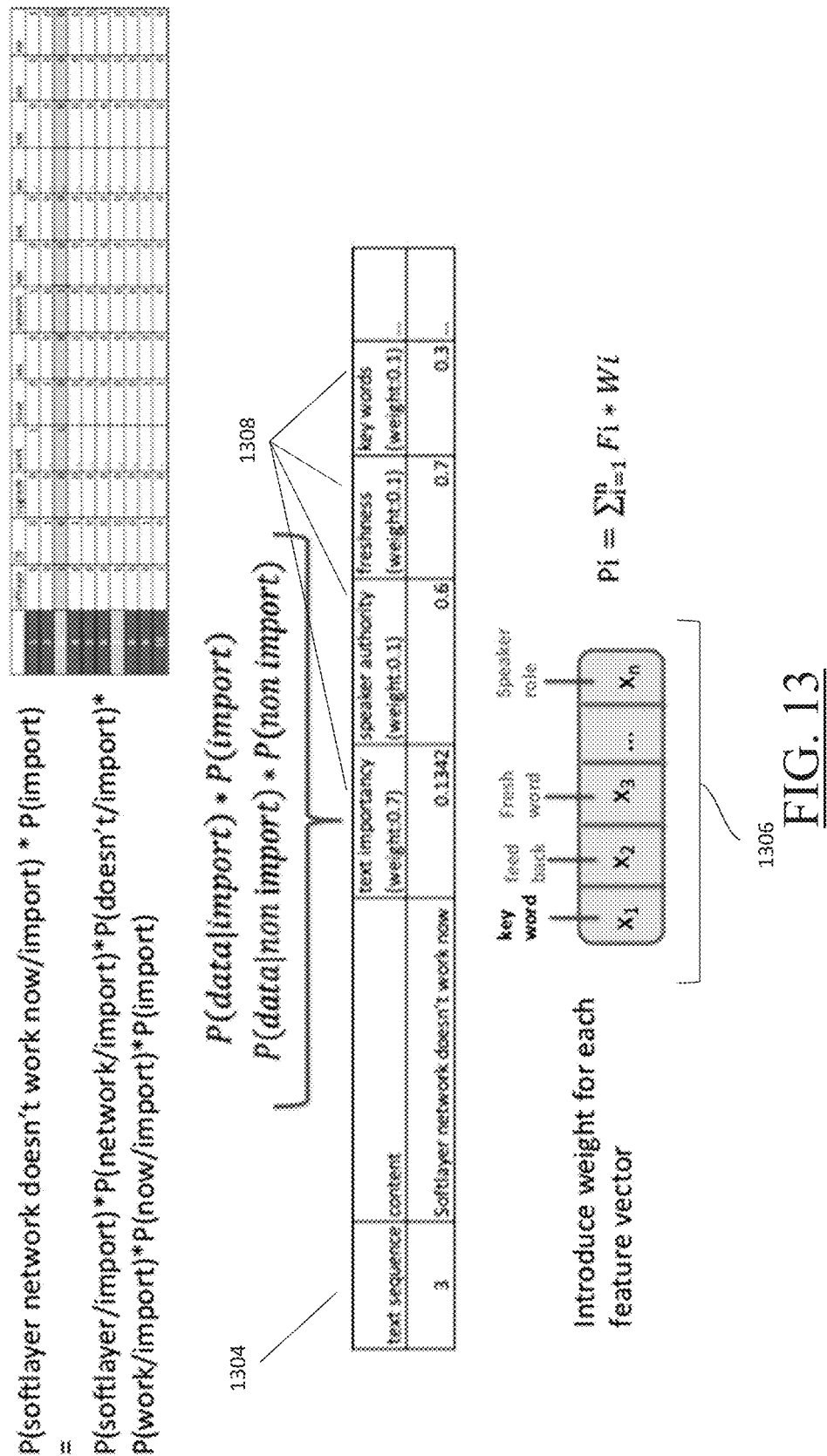
FIG. 13 illustrates an example scenario wherein example content from an individual message within an individual conversation thread is analyzed to determine if the example individual message within the individual conversation thread is important or non-important, according to embodiments of the disclosure.

FIG. 13 illustrates an example scenario showing how example content from an individual message within an individual conversation thread is analyzed to determine if the example individual message within the individual conversation thread is important or non-important. In the example scenario shown, the individual message 1302 states the following, "softlayer network doesn't work now". In order to determine whether the individual message 1302 is important or non-important, NLP may use Bayes Algorithm in the form of the following equation:

P(softlayer network doesn't work now/import)*P
(import)=P(softlayer/import)*P(network/import)
*P(doesn't/import)*P(work/import)*P(now/
import)*P(import)

As shown in FIG. 13, the result of the above mentioned equation may be expressed in a content table 1304. As shown in the content table 1304, weights (W$_i$) 1308 for each feature vector (F$_i$) 1306 may be assigned. For example, as shown in the content table 1304, text importance, speaker role/authority, freshness, and/or keywords may be examples of weights (W$_i$) categories for each feature vector 1306. Once the weight values are calculated for each feature vector 1306, a probability of importance (P$_i$) for the individual message 1302 can be calculated using the following equation:

$$Pi = \sum_{i=1}^{n} Fi * Wi$$

Figure 14:
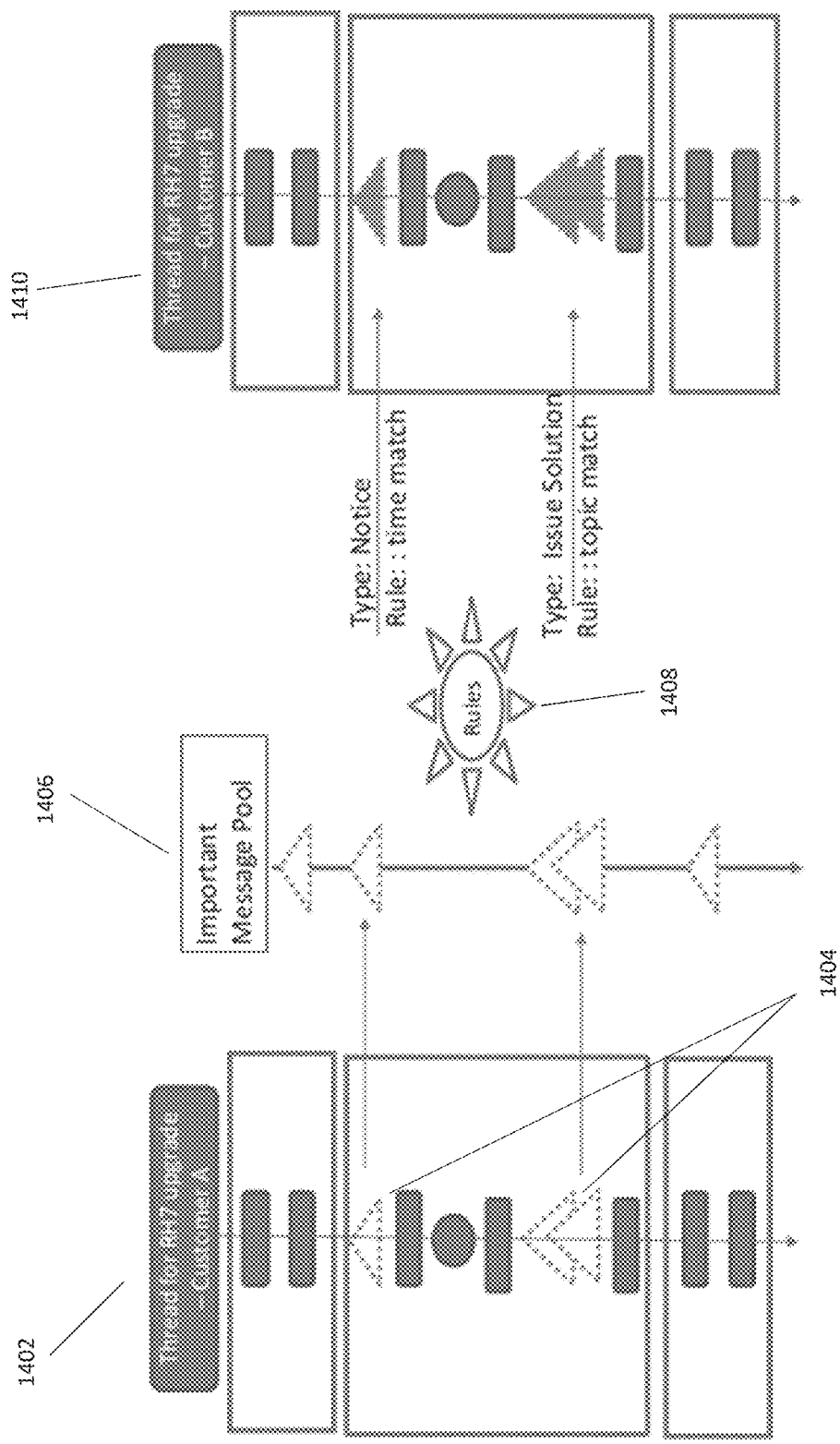
FIG. 14 illustrates a flow chart showing how important messages can be placed within an individual conversation thread based on one or more rules, according to an embodiments of the disclosure.

FIG. 14 illustrates a flow chart showing how important messages can be placed within an individual conversation thread based on one or more rules, in accordance with embodiments of the disclosure. As shown in FIG. 14, the first individual conversation thread 1402 may have one or messages 1404 extracted to an important message pool 1406. As mentioned previously, NLP can be used to analyze one or more messages 1404 within an individual conversation thread to determine a calculated probability that the one or more messages 1404 within an individual conversation thread are either important or non-important. As shown in FIG. 14, one or more rules 1408 may allow the one or more messages 1404 extracted from the first individual conversation thread 1402 to the important message pool 1406 to be added to a second individual conversation thread 1410. In some embodiments, the one or more rules 1408 may include a predefined content policy and/or a time policy that can determine which of the one or more messages 1404 extracted from the first individual conversation thread 1402 may be added to the second individual conversation thread 1410.

Figure 15:
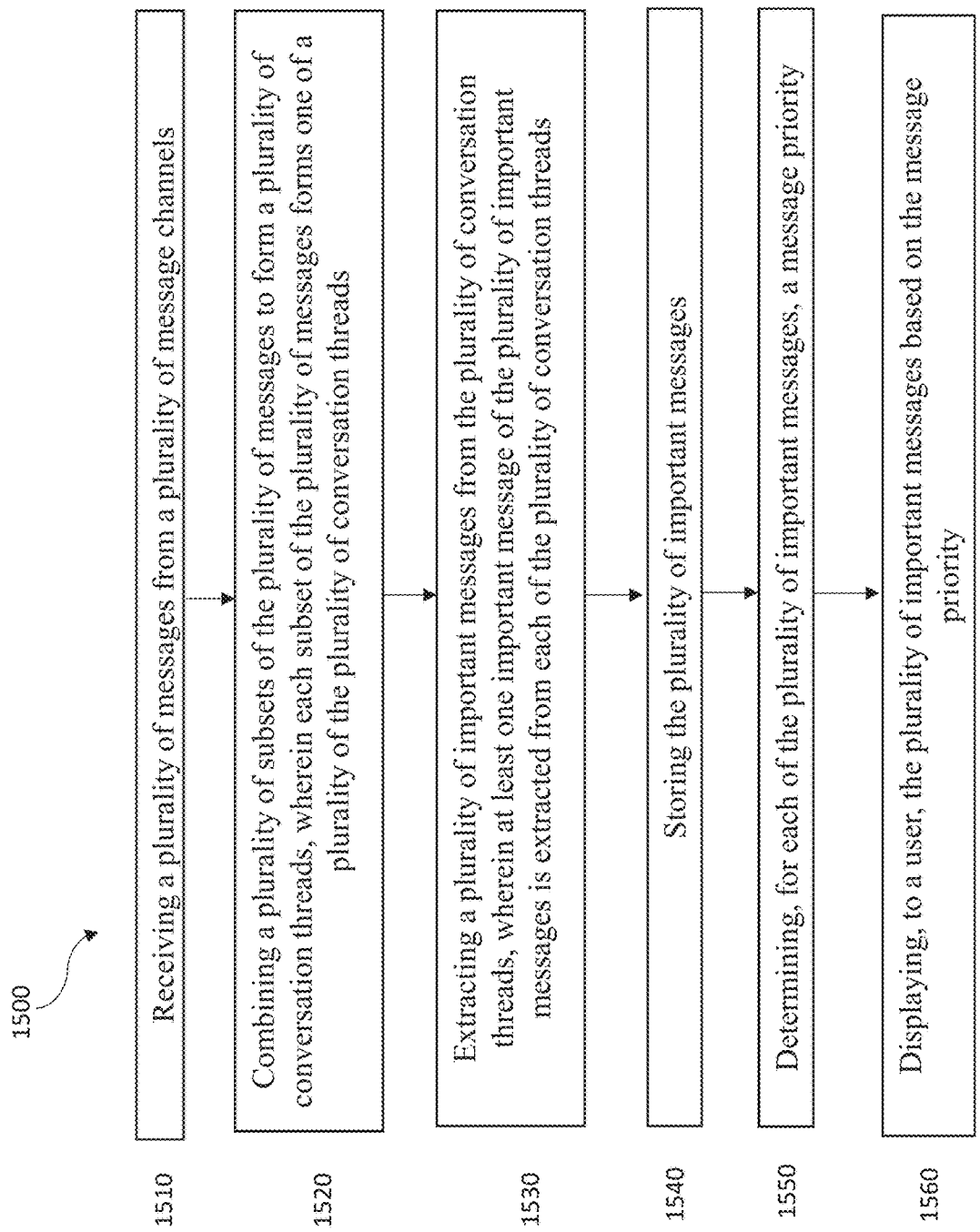
FIG. 15 illustrates how a prioritized global conversation thread is created and displayed to a user, according to embodiments of the disclosure.

FIG. 15 illustrates how a prioritized global conversation thread is created and displayed to a user, according to embodiments of the disclosure. The method 1500 can include a method step 1510 which can include receiving a plurality of messages from a plurality of message channels. The method 1500 can include next method step 1520 which may include combining a plurality of subsets of the plurality of messages to form a plurality of conversation threads, wherein each subset of the plurality of messages forms one of a plurality of the plurality of conversation threads. In some embodiments, two or more individual messages obtained from a plurality of individual conversation threads on different message channels can be combined based on shared characteristics between the two messages such as word relationship, channel characters, user role, user relationship, user history activities analysis, and the like. The method 1500 can include a next method step 1530 which can include extracting a plurality of important messages from the plurality of conversation threads, wherein at least one important message of the plurality of important messages is extracted from each of the plurality of conversation threads. The method 1500 can include a next method step 1540 which can include storing the plurality of important messages. The method 1500 can include a next method step 1550 which can include determining for each of the plurality of important messages a message priority. The method 1500 can include a next method step 1560 which can include displaying to a user the plurality of important messages based on the message priority.

FIG. 16 is a flow chart showing how message status can be determined for an individual message within a conversation thread, according to an embodiment of the disclosure. The algorithm flow chart 1600 can include an algorithm step 1610 which can include receiving a plurality of conversation threads. The algorithm flow chart 1600 can include a next algorithm step 1620 which can include Determining a pattern of one of the plurality of conversation threads. The algorithm flow chart 1600 can include a next algorithm step 1630. At this step, there can be two steps dependent upon if the determined pattern matches a completed pattern. If the determined pattern matches a completed pattern, the next algorithm step 1640 may include determining that the message status of the thread is closed. Conversely, if the determined pattern does not match a completed pattern, the next algorithm step 1650 may include determining that the message status of the thread is open. As should be appreciated, this algorithm flow chart 1600 may be applied to newly received/updated conversation threads as shown in FIG. 4.

Figure 17:
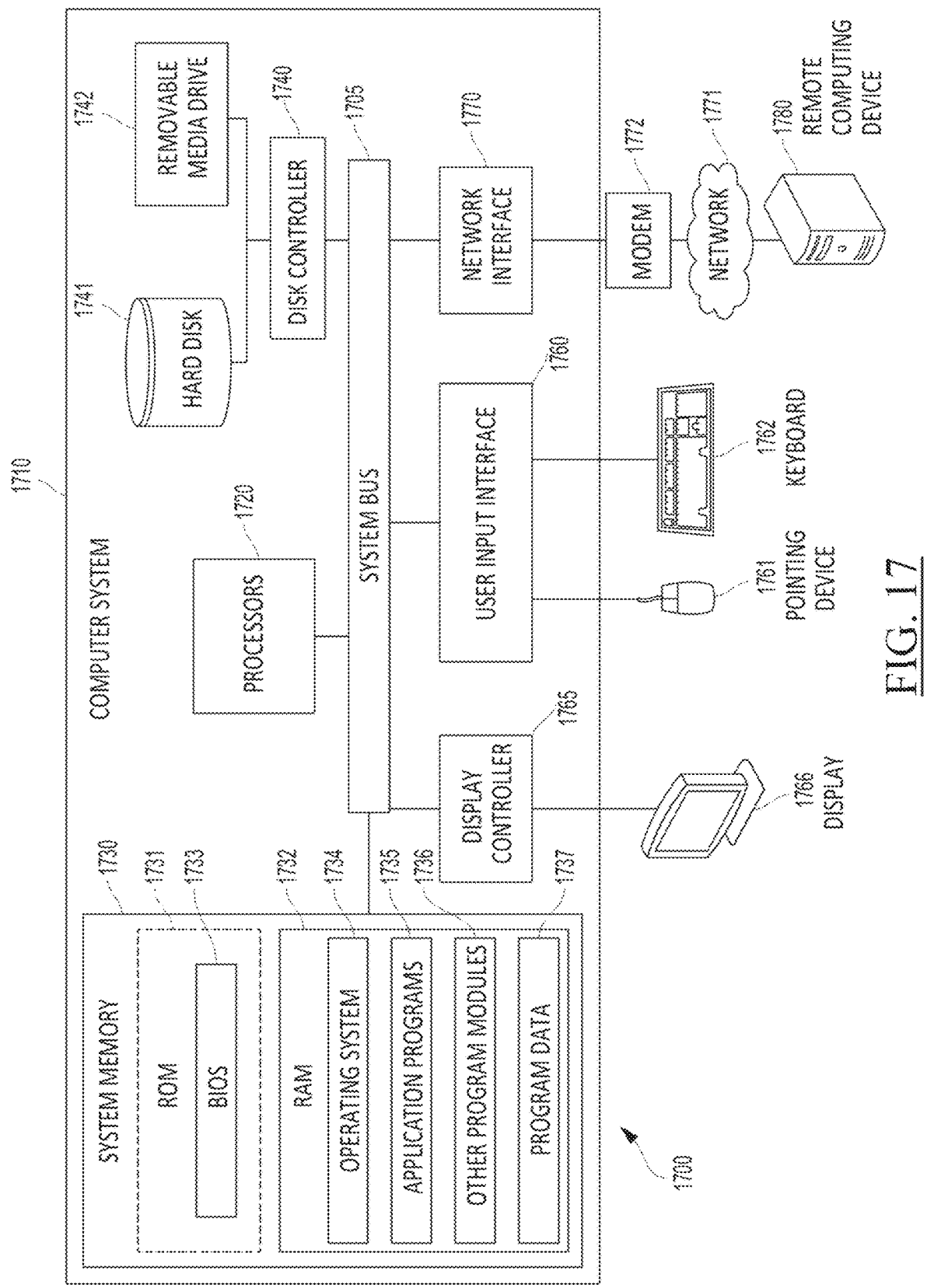
FIG. 17 illustrates an exemplary computing environment, according to embodiments of the disclosure.

FIG. 17 illustrates an exemplary computing environment an exemplary computing environment within which embodiments of the claimed subject matter may be implemented. For example, this computing environment may be configured to execute a method for creating a prioritized global conversation thread. The computing environment may include computer system, which is one example of a computing system upon which embodiments of the claimed subject matter may be implemented. Computers and computing environments, such as computer system and computing environment, are known to those of skill in the art and thus are described briefly here.

As shown in FIG. 17, the computer system may include a communication mechanism such as a bus or other communication mechanism for communicating information within the computer system. The computer system further includes one or more processors coupled with the bus for processing the information. The processors may include one or more central processing units (CPUs), graphical processing units (GPUs), or any other processor known in the art.

The computer system also includes a system memory coupled to the bus for storing information and instructions to be executed by processors. The system memory may include computer readable storage media in the form of volatile and/or nonvolatile memory, such as read only memory (ROM) and/or random-access memory (RAM). The system memory RAM may include other dynamic storage device(s) (e.g., dynamic RAM, static RAM, and synchronous DRAM). The system memory ROM may include other static storage device(s) (e.g., programmable ROM, erasable PROM, and electrically erasable PROM). In addition, the system memory may be used for storing temporary variables or other intermediate information during the execution of instructions by the processors. A basic input/output system (BIOS) containing the basic routines that help to transfer information between elements within computer system, such as during start-up, may be stored in ROM. RAM may contain data and/or program modules that are immediately accessible to and/or presently being operated on by the processors. System memory may additionally include, for example, operating system, application programs, other program modules and program data.

The computer system also includes a disk controller coupled to the bus to control one or more storage devices for storing information and instructions, such as a hard disk and a removable media drive (e.g., floppy disk drive, compact disc drive, tape drive, and/or solid-state drive). The storage devices may be added to the computer system using an appropriate device interface (e.g., a small computer system interface (SCSI), integrated device electronics (IDE), Universal Serial Bus (USB), or FireWire).

The computer system may also include a display controller coupled to the bus to control a display, such as a cathode ray tube (CRT) or liquid crystal display (LCD), for displaying information to a computer user. The computer system includes an input interface and one or more input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. The display may provide a touch screen interface which allows input to supplement or replace the communication of direction information and command selections by the pointing device.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

The computer system may perform a portion or all of the processing steps of embodiments of the invention in response to the processors executing one or more sequences of one or more instructions contained in a memory, such as the system memory. Such instructions may be read into the system memory from another computer readable medium, such as a hard disk or a removable media drive. The hard disk may contain one or more datastores and data files used by embodiments of the present disclosure. Datastore contents and data files may be encrypted to improve security. The processors may also be employed in a multi-processing arrangement to execute the one or more sequences of instructions contained in system memory. In alternative embodiments, hard-wired circuitry may be used in place of or in combination with software instructions. Thus, embodiments are not limited to any specific combination of hardware circuitry and software.

As stated above, the computer system may include at least one computer readable medium or memory for holding instructions programmed according to embodiments of the claimed subject matter and for containing data structures, tables, records, or other data described herein. The term "computer readable medium" as used herein refers to any medium that participates in providing instructions to the processor for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk or removable media drive. Non-limiting examples of volatile media include dynamic memory, such as system memory. Non-limiting examples of transmission media include coaxial cables, copper wire, and fiber optics, including the wires that make up the bus. Transmission media may also take the form of acoustic or light waves, such as those generated during radio wave and infrared data communications.

The computing environment may further include the computer system operating in a networked environment using logical connections to one or more remote computers, such as remote computer. Remote computer may be a personal computer (laptop or desktop), a mobile device, a server, a router, a network PC, a peer device or other common network node, and typically includes many or all of the elements described above relative to computer system. When used in a networking environment, computer system may include modem for establishing communications over a network, such as the Internet. Modem may be connected to bus via the user network interface or via another appropriate mechanism.

Network may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system and other computers (e.g., remote computer). The network may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

Numerous characteristics and advantages have been set forth in the above description, together with details of structure and function. While the claimed subject matter has been disclosed in several forms, it will be apparent to those skilled in the art that many modifications, additions, and deletions, especially in matters of shape, size, and arrangement of parts, can be made therein without departing from the spirit and scope of the claimed subject matter and its equivalents as set forth in the following claims. Therefore, other modifications or embodiments as may be suggested by the teachings herein are particularly reserved as they fall within the breadth and scope of the claims here appended.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed:

1. A computer implemented method for creating a prioritized global conversation thread in a data processing system comprising a processing device and a memory comprising instructions which are executed by the processing device, the method comprising:
   receiving a plurality of messages from a plurality of message channels; combining a plurality of subsets of the plurality of messages to form a plurality of conversation threads, wherein each subset of the plurality of messages forms one of a plurality of the plurality of conversation threads;
   extracting a plurality of important messages from the plurality of conversation threads, wherein at least one important message of the plurality of important messages is extracted from each of the plurality of conversation threads;
   storing the plurality of important messages;
   determining, for each of the plurality of important messages, a message priority;
   determining a status of each of the plurality of conversation threads, wherein the status is one of open or closed; and
   displaying, to a user, the plurality of important messages based on the message priority, wherein important messages extracted from open conversation threads have a greater message priority than important messages extracted from closed conversation threads.

2. The computer implemented method of claim 1, wherein combining a plurality of subsets of the plurality of messages to form a plurality of conversation threads comprises:
   combining two or more messages of the plurality of messages based on one or more of each or the two or more messages' word relationship, channel characters, user role background, user relationship, and user history activities analysis.

3. The computer implemented method of claim 2, wherein combining a plurality of subsets of the plurality of messages to form a plurality of conversation threads comprises:
   combining two or more messages of the plurality of messages based on a predefined policy.

4. The computer implemented method of claim 3, wherein the predefined policy is one of a time match policy and a topic match policy.

5. The computer implemented method of claim 1, wherein extracting a plurality of important messages from the plurality of conversation threads comprises:
   determining that one of the messages of one of the plurality of conversation threads comprises a keyword.

6. The computer implemented method of claim 1, wherein extracting a plurality of important messages from the plurality of conversation threads comprises:
   determining that one of the messages of one of the plurality of conversation threads comprises is from a person with an important role.

7. The computer implemented method of claim 1, wherein determining a status of each of the plurality of conversation threads comprises:
   determining a pattern of one of the plurality of conversation threads; comparing the determined pattern to a completed pattern;
   determining that the determined pattern matches the completed pattern; and determining that the one of the plurality of conversation threads is closed.

8. The computer implemented method of claim 7, wherein a pattern of one of the plurality of conversation threads comprises a position of a popular sentence in the one of the plurality of conversation threads.

9. The computer implemented method of claim 1, wherein determining a status of each of the plurality of conversation threads comprises:
   determining a pattern of one of the plurality of conversation threads; comparing the determined pattern to a completed pattern;
   determining that the determined pattern does not match the completed pattern; and determining that the one of the plurality of conversation threads is open.

10. A computer program product comprising computer-readable, non-transitory media, wherein the non-transitory media comprises computer-readable program code configured to perform a process to create a prioritized global conversation thread, the process comprising:
    receiving a plurality of messages from a plurality of message channels;
    combining a plurality of subsets of the plurality of messages to form a plurality of conversation threads, wherein each subset of the plurality of messages forms one of a plurality of the plurality of conversation threads;
    extracting a plurality of important messages from the plurality of conversation threads, wherein at least one important message of the plurality of important messages is extracted from each of the plurality of conversation threads;
    storing the plurality of important messages;
    determining, for each of the plurality of important messages, a message priority;
    determining a status of each of the plurality of conversation threads, wherein the status is one of open or closed; and
    displaying, to a user, the plurality of important messages based on the message priority, wherein important messages extracted from open conversation threads have a greater message priority than important messages extracted from closed conversation threads.

11. The computer program product of claim 10, wherein combining a plurality of subsets of the plurality of messages to form a plurality of conversation threads comprises:
    combining two or more messages of the plurality of messages based on one or more of each or the two or more messages' word relationship, channel characters, user role background, user relationship, and user history activities analysis.

12. The computer program product of claim 11, wherein combining a plurality of subsets of the plurality of messages to form a plurality of conversation threads comprises:
    combining two or more messages of the plurality of messages based on a predefined policy.

13. The computer program product of claim 12, wherein the predefined policy is one of a time match policy and a topic match policy.

14. The computer program product of claim 10, wherein extracting a plurality of important messages from the plurality of conversation threads comprises:
    determining that one of the messages of one of the plurality of conversation threads comprises a keyword.

15. The computer program product of claim 10, determining a status of each of the plurality of conversation threads comprises:
    determining a pattern of one of the plurality of conversation threads; comparing the determined pattern to a completed pattern;
    determining that the determined pattern matches the completed pattern; and determining that the one of the plurality of conversation threads is closed.

16. The computer program product of claim 15, wherein a pattern of one of the plurality of conversation threads comprises a position of a popular sentence in the one of the plurality of conversation threads.

17. The computer program product of claim 10, wherein determining a status of each of the plurality of conversation threads comprises:
    determining a pattern of one of the plurality of conversation threads; comparing the determined pattern to a completed pattern;
    determining that the determined pattern does not match the completed pattern; and determining that the one of the plurality of conversation threads is open.

18. A system for creating a prioritized global conversation thread comprising a processing device and a memory comprising instructions that are executed by the processing device to perform a method comprising:
    receiving a plurality of messages from a plurality of message channels; combining a plurality of subsets of the plurality of messages to form a plurality of conversation threads, wherein each subset of the plurality of messages forms one of a plurality of the plurality of conversation threads;
    extracting a plurality of important messages from the plurality of conversation threads, wherein at least one important message of the plurality of important messages is extracted from each of the plurality of conversation threads;
    storing the plurality of important messages;
    determining, for each of the plurality of important messages, a message priority;
    determining a status of each of the plurality of conversation threads, wherein the status is one of open or closed; and
    displaying, to a user, the plurality of important messages based on the message priority, wherein important messages extracted from open conversation threads have a greater message priority than important messages extracted from closed conversation threads.

* * * * *